(12) United States Patent
Ayoola et al.

(10) Patent No.: US 11,769,094 B2
(45) Date of Patent: Sep. 26, 2023

(54) SYSTEM AND METHOD FOR REAL-TIME DISTRIBUTED MICRO-GRID OPTIMIZATION USING PRICE SIGNALS

(71) Applicant: ElectricFish Energy Inc., Fremont, CA (US)

(72) Inventors: Folasade Ayoola, Stanford, CA (US); Anurag Kamal, Sunnyvale, CA (US); Nelio Batista do Nascimento, Mountain View, CA (US); Vincent Curtis Wong, Berkeley, CA (US)

(73) Assignee: ELECTRICFISH ENERGY INC., Berkeley, CA (US)

( * ) Notice: Subject to any disclaimer, the term of this patent is extended or adjusted under 35 U.S.C. 154(b) by 0 days.

(21) Appl. No.: 17/967,583

(22) Filed: Oct. 17, 2022

(65) Prior Publication Data

US 2023/0024900 A1    Jan. 26, 2023

Related U.S. Application Data

(63) Continuation-in-part of application No. 17/688,590, filed on Mar. 7, 2022, which is a continuation of application No. 17/385,624, filed on Jul. 26, 2021, now Pat. No. 11,270,243, which is a continuation-
(Continued)

(51) Int. Cl.
| | |
|---|---|
| *H01M 10/44* | (2006.01) |
| *H01M 10/46* | (2006.01) |
| *G06Q 50/06* | (2012.01) |
| *G06N 20/00* | (2019.01) |
| *B60L 53/60* | (2019.01) |
| *H02J 3/32* | (2006.01) |
| *G06Q 10/0635* | (2023.01) |

(52) U.S. Cl.
CPC ........... *G06Q 10/0635* (2013.01); *B60L 53/60* (2019.02); *G06N 20/00* (2019.01); *G06Q 50/06* (2013.01); *H02J 3/322* (2020.01)

(58) Field of Classification Search
CPC ....... H02J 3/322; H02J 3/32; H02J 7/07; H02J 2203/10; B60L 53/60; B60L 53/66; B60L 53/53; G06N 20/00; G06Q 50/06; G06Q 10/0635
USPC ......... 320/107, 110, 114, 132, 149; 705/7.28, 705/7.35, 7.38, 7.11
See application file for complete search history.

(56) References Cited

U.S. PATENT DOCUMENTS

2017/0329319 A1* 11/2017 Kopp ..................... G01R 1/36
2018/0358812 A1   12/2018 Anderson et al.
(Continued)

*Primary Examiner* — Edward Tso
(74) *Attorney, Agent, or Firm* — Galvin Patent Law LLC; Brian R. Galvin

(57) ABSTRACT

A system and method for providing real-time distributed micro-grid optimization using price signals to the electrical grid system by allowing bi-directional electricity usage from a distributed network of energy storage stations to form a large, distributed resource for the grid. A machine learning optimization module ingests various forms of data—from grid telemetry to traffic data to trip-to-trip data and more-in order to make informed spatiotemporal decisions about optimal pricing signals as well as strategically placing and balancing energy stores across various regions to support optimum energy usage, risk mitigation, grid fortification, and revenue generation. Energy stores are then sent updated price signals and updated parameters as to the amount of energy to hold or release.

20 Claims, 21 Drawing Sheets

Related U.S. Application Data

(63) in-part of application No. 17/317,563, filed on May 11, 2021, now abandoned, which is a continuation-in-part of application No. 17/085,352, filed on Oct. 30, 2020, now Pat. No. 11,007,891.

(60) Provisional application No. 63/359,721, filed on Jul. 8, 2022, provisional application No. 63/086,098, filed on Oct. 1, 2020.

(56) References Cited

U.S. PATENT DOCUMENTS

2021/0221247 A1    7/2021    Daniel et al.

* cited by examiner

SYSTEM AND METHOD FOR REAL-TIME DISTRIBUTED MICRO-GRID OPTIMIZATION USING PRICE SIGNALS

CROSS-REFERENCE TO RELATED APPLICATIONS

Priority is claimed in the application data sheet to the following patents or patent applications, the entire written description, including figures, of each of which is expressly incorporated herein by reference in its entirety:
63/359,721
17/688,590
17/385,624
17/317,563
17/085,352
63/086,098

BACKGROUND OF THE INVENTION

Field of the Invention

This disclosure relates to the field of energy conservation and management, and more particularly to the field of power grid resource management and risk mitigation.

Discussion of the State of the Art

Electricity is by its nature difficult to store so it must be generated as it is needed for large-scale applications. Consequently, unlike other energy sources, it is not possible to keep a supply on hand and simply transfer it to a customer. Furthermore, supply and demand vary continuously under ever-changing conditions. Utility companies must closely monitor grid demand to determine how to allocate energy resources, which can mean that electricity is unavailable for charging in many cases, such as blackouts and brownouts. Current EV (Electric Vehicle) charging systems only allow power to flow in one direction: from the grid through the charging system and into the EVs internal battery, i.e., they are nothing more than an outlet for an EV car. While some applications of vehicle-to-grid power transfer exist, they are critically limited by human behavior — time of power transfer —on a large scale as to make a sufficient negative impact in meeting increased demand in hours of short supply. With increased adoption of electric vehicles in the effort to decarbonize transportation, particularly with the deep integration of variable renewable energy resources in the generation resource mix, it becomes increasingly challenging to balance the grid and ensure reliability of supply. The occurrence of failure events has significant social and economic cost which disproportionately impacts lower-income, non-White communities. Additionally, these communities are less prepared for such events, and less likely to recover as quickly.

What is needed is a system and method for electrical grid risk mitigation, fortification, and resilience by allowing bi-directional electricity usage from a distributed network of energy storage stations to form a large, distributed resource for the grid as well as ensuring equitable access to energy.

SUMMARY OF THE INVENTION

Accordingly, the inventor has developed and reduced to practice a system and method for providing real-time distributed micro-grid optimization using price signals to the electrical grid system by allowing bi-directional electricity usage from a distributed network of energy storage-integrated EV charging stations to form a large, distributed resource for the grid. A machine learning optimization module ingests various forms of data—from grid telemetry to traffic data to trip-to-trip data and more-in order to make informed spatiotemporal decisions about optimal pricing signals as well as strategically placing and balancing energy stores across various regions to support optimum energy usage, risk mitigation, grid fortification, and revenue generation. Energy stores are then sent updated price signals and updated parameters as to the amount of energy to hold or release According to a first preferred embodiment, a system for real-time distributed micro-grid optimization using price signals is disclosed, comprising: a computing device comprising a memory, a processor, and a non-volatile data storage device; a pricing engine comprising a first plurality of programming instructions stored in the memory of, and operating on the processor of, the computing device, wherein the first plurality of programming instructions, when operating on the processor, cause the computing device to: obtain a plurality of spatiotemporal information relating to an electrical grid, real-time and historical traffic flow, and real-time and historical energy demand; spatially align the plurality of spatiotemporal information into one or more regions; determine a load profile for each of the one or more specified regions, wherein the load profile is determined using real-time and historical traffic flow and energy demand data; receive an overall risk score for each of the one or more regions; compute the state of charge and the maximum revenue for each of the one or more regions; use the plurality of spatiotemporal information, the spatially aligned information, the load profile, the computed state of charge, the overall risk score, and the computed maximum revenue as inputs into a neural network configured to generate as output a predicted price signal for each of the one or more regions; and distribute the price signal to each corresponding region of the one or more regions, wherein the price signal may be used to configure the operation of an energy storage system within the corresponding region.

According to a second preferred embodiment, a method for real-time distributed micro-grid optimization using price signals is disclosed, comprising the steps of: obtaining a plurality of spatiotemporal information relating to an electrical grid, real-time traffic flow, and real-time energy demand; spatially aligning the plurality of spatiotemporal information into one or more regions; determining a load profile for each on the one or more specified regions, wherein the load profile is determined using real-time traffic flow and energy demand data; receiving an overall risk score for each of the one or more regions; computing the state of charge and the maximum revenue for each of the one or more regions; using the plurality of spatiotemporal information, the spatially aligned information, the load profile, the computed state of charge, the overall risk score, and the computed maximum revenue as inputs into a neural network configured to generate as output a predicted price signal for each of the one or more regions; and distributing the price signal to each corresponding region of the one or more regions, wherein the price signal may be used to configure the operation of an energy storage system within the corresponding region.

According to an aspect of an embodiment, an optimization engine comprising a second plurality of programming instructions stored in the memory of, and operating on the processor of, the computing device, wherein the second plurality of programming instructions, when operating on the processor, cause the computing device to: retrieve training data relating to the electrical grid and its components for each specified region of the one or more regions; retrieve training data relating to the climate and weather for a plurality of specified regions; retrieve training data relating to socio-economic factors for a plurality of specified regions; retrieve training data relating to local behavior patterns for a plurality of specified regions; use the training data for each of the specified regions in the plurality of specified regions to calculate an overall risk score for each specified region; and send the overall risk score for each of the one or more regions to the pricing and control engine.

According to an aspect of an embodiment, the optimization engine is further configured to: retrieve a status on the current energy demands for each of the specified regions in the plurality of specified regions; receive the monitored health and status data from the local controller; use the overall risk scores and the current energy demands for each of the specified regions and the electronic health and status data from a controller to optimize the energy storage of a high-voltage battery pack or packs; and send a control signal to the controller, the control signal causes the high-voltage battery pack to store more power, store less power, or maintain the current level of stored power.

According to an aspect of an embodiment, the pricing engine is further configured to: construct and maintain a second neural network configured to determine the complex relationships between temporal and spatial data; and use the plurality spatiotemporal data, the spatially aligned data, the load profile, and overall risk scores as input into the second neural network, wherein the second neural network generates as output context-rich data relating temporal and spatial data together.

According to an aspect of an embodiment, the neural network is a deep reinforcement neural network.

According to an aspect of an embodiment, the one or more regions are represented as traffic analysis zones.

According to an aspect of an embodiment, the controller sets the time of charging of the high-voltage battery based on a grid condition.

According to an aspect of an embodiment, the grid condition is a time period wherein electricity rates are low.

According to an aspect of an embodiment, the grid condition is a time period when the proportion of energy supply to the grid from renewable energy sources is high.

According to an aspect of an embodiment, risk scores are calculated using one or more machine learning models.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
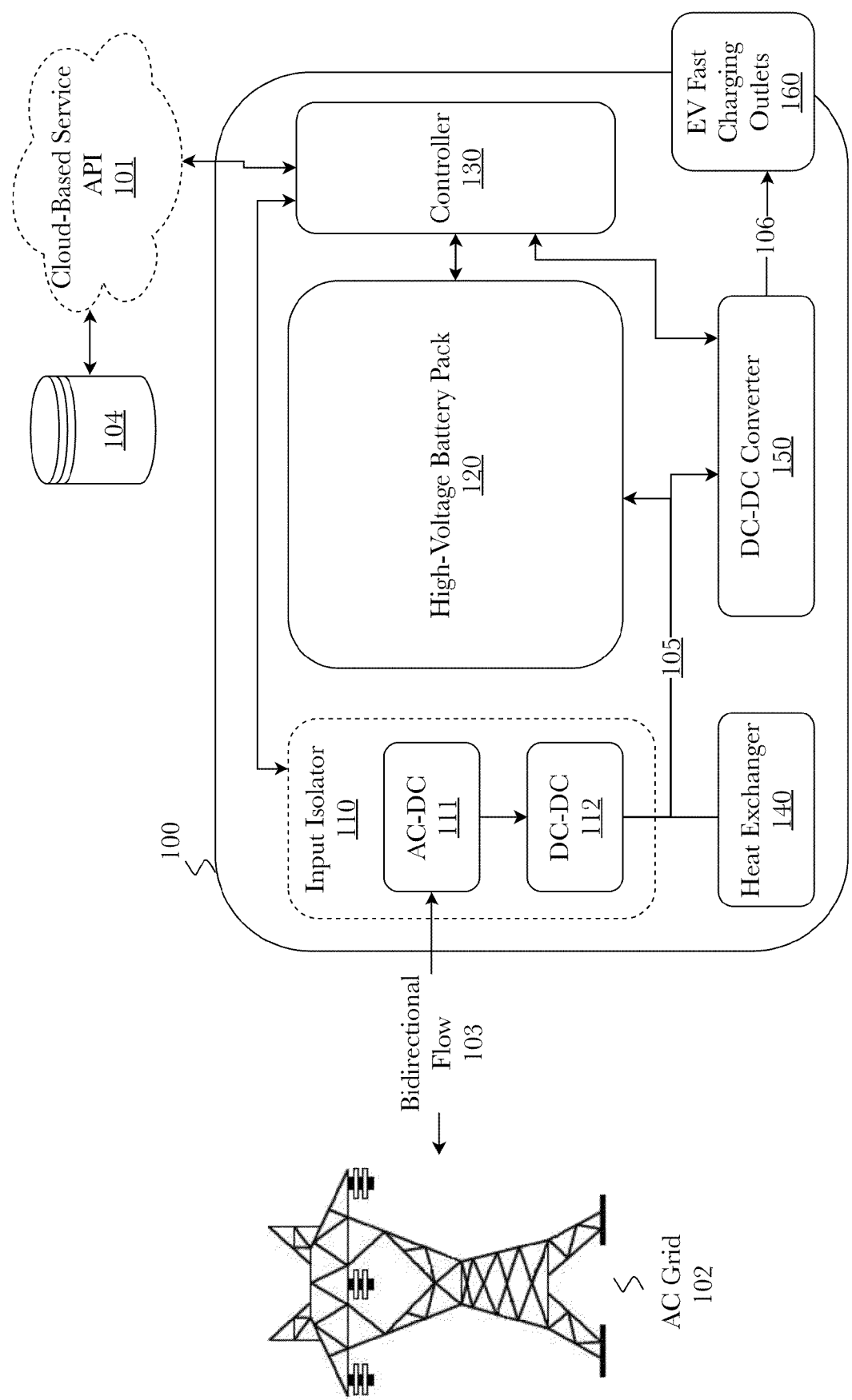
FIG. 1 is a diagram of an exemplary system architecture for an extremely fast charging and distributed grid resource adequacy management system.

Accordingly, the inventor has developed and reduced to practice a system and method for providing real-time distributed micro-grid optimization using price signals to the electrical grid system by allowing bi-directional electricity usage from a distributed network of energy storage stations to form a large, distributed resource for the grid. A machine learning optimization module ingests various forms of data —from grid telemetry to traffic data to trip-to-trip data, real-time carbon-intensity of electricity grid and more—in order to make informed spatiotemporal decisions about optimal pricing signals as well as strategically placing and balancing energy stores across various regions to support optimum energy usage, risk mitigation, grid fortification, and revenue generation. Energy stores are then sent updated price signals and updated parameters as to the amount of energy to hold or release.

The transportation sector is the leading cause of greenhouse gas emissions globally, accounting for 24% of direct $CO_2$ emissions from fossil fuel combustion. The biggest culprits, with a 75% share of this, are road vehicles. Small-to-medium duty passenger road vehicles account for almost half of road emissions—a whopping 3.6 gigatons per year or a tenth of all global annual emissions. A clear pathway to decarbonizing transportation is by electrification. However, the actual carbon mitigation impact of these alternatives depends on their lifecycle emissions intensities, which in the case of electric vehicles (EVs), the emissions intensity of the electricity used as vehicular "fuel". In addition, there remains the challenge of delivering the energy alternative to the end-user, which in the case of EVs, is the challenge of reliable electricity transmission and distribution under increased power and energy demand.

While EV deployment is gaining traction globally, penetration remains at an abysmal 2%, with the most commonly cited barriers to adoption being range anxiety along with easily accessible and equitably distributed charging infrastructure. Furthermore, electric utilities are concerned about their ability to maintain grid reliability given huge power draws with the grid ties of status quo charging infrastructure from uncontrolled charging. Regulators and utilities could of course utilize time-of-use rate structures to manage this problem while accelerating deployment plans, but concerns remain about high retail electricity rates, especially with the disproportionate impact on lower-income, lower electricity consumption ratepayers.

One potential solution to the challenge presented is the utilization of an energy storage device such as a battery, integrated with EV direct current fast chargers (DCFC). These batteries may be deployed at public, easily accessible locations and used to create a network of distributed energy resources (DER), delivering valuable utility and ISO services, including resource adequacy.

According to one embodiment, energy storage stations are set up strategically in one or more regions. The basis for such a strategy may be physical traits (e.g., fire hazard risk level, below sea-level, antiquated infrastructure, etc.), socio-economic traits (e.g., median-household income, disadvantaged communities, propensity of EV ownership, etc.), or electrical grid characteristics (e.g., demand, location in the feeder network, etc.). One anticipated aspect is that EV charging stations will begin to match the numbers of fuel stations and potentially overcome fuel stations as EV vehicles overtake fuel vehicles. In such a case, fuel stations may be converted into EV stations which may serve very well considering the actual energy storage battery packs disclosed herein may be stored where there was once fuel storage—underground. Many different reasons and strategies may work for the system and the disclosed invention is not limited to any strategy.

With energy stores in place, cloud-based neural networks begin learning about the grid, and patterns thereof. The neural networks learn this by ingested data such as telemetry already available from devices on the grid, the energy storage stations, and basically any type of data that is reasonable for learning the patterns and behaviors of the grid —which inherently means the users as well. Grid data helps identify regions with frequent network outages and compare such to unfulfilled grid capacity in corresponding energy storage stations. Climate data informs the neural networks about such things as potential natural disasters or frequent fire events which often disrupt distribution and transmission electric lines in an affected region—frequent power outages are often a surrogate for greater grid hardening need. Traffic and socio-economic data can, from a business sense, increase profitability by determining areas with a higher propensity of EV drivers. Partnerships with state/region wide utility companies further improve the neural networks. CEC (California Energy Commission) and CCAs (Community Choice Aggregation) may incorporate identified regions into their grant themes/ focuses to bring capital to underinvested communities.

The neural networks provide a rank/score as to the electrical demand and electrical vulnerability of regions. Combining the knowledge of regional electrical demand/vulnerability with regional climate and socio-economic information along with strategically placed energy stores allows for a greater command of our electrical grid and its future. The optimization of stored/released energy to the grid is performed via the neural networks but controlled from an optimization core which sends updated parameters to energy stores to change or maintain the amount of energy stored.

Furthermore, national security experts have identified our electrical grid system as a potential target for terrorist attacks. This machine learning/energy storage approach mitigates such an attack by providing as-fast-as-can-be reactions to changes in the grid and having strategically deployed energy stores in place when current power generation fails.

Another aspect comprises building on existing estimates of cost and impact on the energy distribution network, based on cost-benefit analysis framework, by adding target impact factors as inputs into an optimization core. These impact factors would be prioritized based on availability of a validation dataset (i.e., existing studies, etc.). The final output would be a web app-based data aggregator, that enables open API access for using the one or more machine learning algorithms disclosed herein. The API and web app may make available GIS and map overlays for managing the optimization core.

According to one embodiment, the charging station is a single-box, self-contained charging system that integrates charging technologies that are conventionally only available separately and not necessarily compatible with one another. The single-box, self-contained nature of the system allows charging stations to be easily transported and deployed to various location types, while only requiring a single-phase grid connection which may already exist at a target location. According to an embodiment, the system may consist of a controller unit that is responsible for: sending control signals to power electronic components, cooling systems, battery pack, and fire prevention system; exchanging data via an application programming interface connected to a cloud-based service that persists and manages a charging network database, where the deployment of one or more of these systems and their connections to the cloud-based service form a distributed charging network; and optimizing the performance of the system. According to an embodiment, the system further comprises a high-voltage battery pack capable of rapid charge-discharge rates to facilitate extreme fast charging (XFC) for electric vehicles and to support grid resource management by providing supplemental power distribution to a local grid during periods of time when grid energy demand is highest. According to an embodiment, the system further consists of various power electronic equipment such as switches, circuit breakers, power converters and inverters, and passive and active components, configured in a circuit topography that allows bi-directional power flow between a low-voltage alternating current (AC) grid and the EV fast charging system. The controller unit is able to communicate and exchange data via an application programming interface with a cloud-based service that persists and manages charging network data, for example EV fast charging system battery health data and grid demand data. The controller unit may receive and process charging network data using machine learning processes to optimize the performance of the charging system in regards to grid resource management, consumer and or fleet EV fast charging station experience, and economic outcomes for all system actors such as system operators (owners), system users (customers), utility companies, and other third parties that may exist.

One of the goals of the EV fast charging system is to mimic a typical gas station experience for an EV and consumer and/or fleet EV system user. This means that an EV driver can simply pull into an EV fast charging station, begin recharging his EV, and by the time he goes into the store to pay for the charge, buy snacks, or use the restroom, and come back out his EV will be partially charged (e.g., EV range increased by 40-200 miles) and ready to go without having to wait anywhere from thirty minutes to multiple hours. According to an embodiment, the system is able to support current and future EV battery and electronic architectures up to 950 V while providing direct current (DC) fast charging capabilities at up to 350 kW to provide a charge range of up to 200 miles in about ten minutes of charge time. This capability brings EV recharge time more in line with ICEV refuel time. The controller can regulate the output of the EV outlet that connects the charging station to the EV in order to provide charging comparable to level one and two chargers to support existing EV architectures. The high-voltage battery pack is able to support fast charging of one electric vehicles at a time enabling more station throughput. According to an embodiment, EV charging may be limited to a block of time (e.g., 5 minutes, 10 minutes) to promote throughput, optimize queuing, and mirror the expedient experience of buying gas for ICEVs.

The EV fast charging system has a single-phase or three-phase connection to local, low-voltage AC grid that is used to charge the high-voltage battery pack and support EV charging operations. The single-phase or three-phase connection to the grid is isolated from the internal components of the system via an AC-DC to DC-DC converter-inverter circuit that also allows bi-directional flow of power between the grid and the charging station. The controller sends control signals to the power electronic components to direct the flow of power. This allows the charging station to provide the local grid with stored energy when grid conditions warrant the use of additional power reserves. When the charging station is operating to provide power to a local grid it effectively takes over the role of a power distribution substation and forms a microgrid supported by the grid energy reserves stored within the high-voltage battery pack. A traditional substation and the EV fast charging system share data and communicate via the distributed charging network in order to decide when a charging station should engage in grid balancing operations. The deployment of multiple EV fast charging systems represents a virtual "mini-grid" resource that can support local utilities and power service providers through grid balancing actions.

For example, consider two separate EV fast charging stations that are part of the same local grid. The charging stations are able to store energy in their battery packs that was purchased during off peak hours when power rates are low. During evening peak hours (5 pm to 9 pm) the local grid demand is barely being satisfied by grid utility. The substation that supplies power to the local grid can send grid demand and consumption data to the EV charging stations by way of the distributed charging network. The distributed charging network provides a control layer for all charging stations that tracks charging station operation such that it can virtually shift power among and between controllers in the "mini-grid". The EV charging stations use the grid demand and consumption data as well as battery health and EV charging data to determine the optimal amount of battery pack capacity to use as grid reserves. The two charging systems then begin operating in a grid balancing state where they provide EV charging capabilities and power to a local grid to satisfy grid demand. In this way energy purchased and stored during off-peak hours can be used during peak hours to provide lower cost power for consumers, EV drivers, and utilities, while also providing a percentage split in revenue for the EV fast charging station operator.

Furthermore, the EV fast charging system may be configured to begin storing energy based upon predetermined time or event conditions. For example, a timing condition may trigger the system to begin storing energy at a particular time of the day, such as a timing condition that causes the system to store energy at 2 PM in the afternoon to ensure that there are available energy reserves during rush hour to support EV commuters. Another type of condition is an event condition which triggers the system to begin energy storage when a specific event occurs, such as power rates dropping below a given threshold or grid demand grows beyond a threshold. The distributed charging network may access and store electric energy market rates within a database and use the stored data to tabulate and identify market trends using both simple graph analysis and machine learning algorithms, according to an embodiment. The distributed charging network may use the machine learning market rate predictions to autonomously begin energy storage when the market rates are at their lowest cost. In an embodiment, the system defaults to storing energy during periods of time when renewable energy generation is highest during the day (i.e., solar energy generation is highest during daylight hours) and when market rates are low and favorable. This enables the system to store and deliver a mixture of electricity generated from non-renewable sources and green electricity to EVs, which translates to net fewer emission miles required to recharge an EV.

Battery packs as used herein may comprise different battery technologies (i.e., physical/chemical compositions) and may be connected in series, parallel, or a combination of series and parallel, where batteries connected in series increase the voltage, and batteries connected in parallel increase the number of amps, and batteries connected in a combination of series and parallel increase both the voltage and amperage accordingly.

According to an embodiment, the charging station may store an amount of renewable energy in proportion to the renewable energy sources feeding into the grid at any given time. The distributed charging network may keep track of the proportion of renewable energy used to charge the high-voltage battery pack of a charging station within a time frame such as hourly, daily, weekly, monthly, yearly, total lifespan of the charging station, etc. Each charging station may optionally display the running total of the proportion of stored renewable energy to a display screen on the charging station informing charging station customers about the proportion of renewable energy used, and how that translates into much lower overall emissions. For example, the charging network may be able to view the proportions of renewable energy sources and non-renewable energy sources, and calculate the total amount of expected emissions that would have occurred (i.e., using emission rates per gallon of gasoline and using emission rates for non-renewable energy generation) if non-renewable energy sources were used exclusively. This total may also be displayed with the total proportion of renewable energy used to charge the station battery pack, thus giving charging station customers a transparent view into the energy consumption and environmental impact of their electric vehicles.

One or more different aspects may be described in the present application. Further, for one or more of the aspects described herein, numerous alternative arrangements may be described; it should be appreciated that these are presented for illustrative purposes only and are not limiting the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "grid balancing" is used to describe the task of supplying the correct amount of electricity to a grid in order to match the demand. Conventional power plants have to compensate for constant energy fluctuations because it is not possible to store electricity in large quantities over a long period of time. There is an equilibrium point at which all grid networks operate ; in the United States the equilibrium point is held at a frequency of 60 Hz. If there is too much electricity when grid demand is low, then the electrical network frequency increases and power plants that are designed to operate with a certain frequency range can begin shutting down when the frequency is out of the range of operation. If instead, there is not enough electricity to meet the demand, then the frequency of the network drops and power plants may begin to shut down. In both cases, shut down of power plants leads to grid collapse and power blackout. "Grid balancing" tasks are used to maintain grid equilibrium.

As used herein, "resource adequacy" is the ability of a utility to maintain reliable capacity resources (supply) to meet the customers' energy or system loads (demand) at all hours.

Conceptual Architecture

FIG. 1 is a diagram of an exemplary system architecture for an extremely fast charging and distributed grid resource adequacy management system 100. In an embodiment, the system may be comprised of the following components: an input isolator 110, a high-voltage battery pack 120, a controller 130, a heat exchanger 140, a high-power direct current to direct current (DC-DC) converter 150, and one or more electric vehicle (EV) fast charging outlets 160 all self-contained within a single-box design. The single-box, self-contained design allows each charging station system 100 to be easily transported and deployed, requiring only a single-phase connection to an electric grid. The system 100 via the controller 130 may send or request data from a cloud-based service using a cloud-based service application programming interface (API) 101 that provides access to a distributed charging network that interacts with a storage device 104 that maintains a database of charging station information. Having an API is useful for third-party integrations, however the communication method between components is not limited to APIs. In various embodiments, communication between the various components may use one or more communication protocols used in the art such as HTTP(S), TCP/IP, FTP, UDP, etc. and utilize one or more communication means such as Zigbee, MQTT, WiFi, Zwave, Ethernet, Fiber, ISDN, PTSN, Cellular Networks, Bluetooth, Asynchronous Transfer Mode, etc. The deployment of multiple charging station systems 100 operates as a "mini-grid" while communicating with a distributed charging network that contains a control layer that can virtually "shift" power among and between charging station controllers 130 in the "mini-grid." The input isolator 110 contains power electronic components that both isolate the system 100 DC circuitry from the low voltage AC grid 102 and facilitate bi-directional power flow 103.

According to an embodiment, the input isolator 110 may contain power electronic components such as an alternating current to direct current (AC-DC) converter 111 and a DC-DC converter 112 in a series connection. The topography of the input isolator 110 is chosen such that the series connection of 111 and 112 forms a bi-directional AC-DC converter-inverter that can both convert AC to DC and invert DC to AC using the same circuit topography. A converter-inverter topography allows the system 100 to use the AC grid 102 power for charging the high-voltage battery pack 120 at optimal times based on certain conditions (e.g., when power rates are low cost or when the percentage of renewable energy generation entering the grid is high), or use the high-voltage battery pack 120 to release energy back into the AC grid 102, thus facilitating bi-directional flow 103 of energy to enable grid services such as frequency regulation and demand response. In an embodiment, a T-type inverter and a DC-DC converter, that provides isolation between the AC grid 102 system and the internal components of the system 100, are used to balance the voltages of the battery pack 120, however, other topologies and technologies exist such as cascaded H Bridge (CHB), modular multilevel converters (MMCs), and medium-voltage Silicon Carbide (SiC) devices, among others. The input isolator 110 is connected internally to an 800 Volt (V) bus 105 that is connected to the high-power DC-DC converter 150, a heat exchanger 140, and charges the high-voltage battery pack 120. The heat exchanger 140 is used to ensure the system 100 temperature is limited to safe operating conditions. The heat exchanger 140 may take many forms including, but not limited to shell and tube, plate, air-to-air, plate and shell, fluid heat exchangers, adiabatic wheel, and direct contact heat exchangers.

According to an embodiment, the high-voltage battery pack 120 supports a nominal voltage of 800 V and is able to store 350 kilo-Watt-hours (kWh) of energy. To enable 350 kilo-Watt (kW) extremely fast charging, the battery pack 120 is capable of sustaining up to 2 C discharge rates continuously. The high-voltage battery pack 120 may consist of one or more of a plurality of individual batteries configured in a series, parallel, or combination of series and parallel connections.

The EV fast charging outlets 160 allow for extremely fast charging of electric vehicles using DC-powered charging ports. In an embodiment, the DC power for the charging ports is delivered from either the high-voltage battery pack 120, or from the grid directly by way of the bus 105 and a high power, high efficiency DC-DC converter 150. In an embodiment, a half bridge converter is used to achieve the highest efficiencies, however, other topologies may provide DC-DC conversion such as buck and boost converters. The EV fast charging outlet 160 is also capable of providing charge at both level 1 and level 2 by limiting the total power output from the DC-DC converter 150 using control signals from the controller 130. With a maximum bus 106 voltage of up-to 1050 V the outlets 160 can charge vehicle architectures from 200-950 V which makes this system easily integrate with a rapidly growing and evolving EV industry. According to an embodiment, the charging cables that connect the EV fast charging outlets 160 must be able to withstand a peak current of 500 Amp (A) continuously at the peak output voltage of 950 V and be liquid cooled to properly handle heat transfer between the current carrying wire and the rest of the cable materials and components.

In an embodiment, the extremely fast charging and distributed grid resource adequacy management system 100 is controlled by an on-board, cloud-connected controller 130 that performs tasks to optimize energy storage, exchange, and distribution. The controller 130 is responsible for mediating grid energy flow optimization, active monitoring of battery health, communicating with EVs via a charger communication protocol, and communicating with a cloud-based service to submit and request various types of data including, but not limited to: grid status and capacity information, power rates, power consumption, charging station status details and history, EV status details and history, battery status and lifespan, payments, consumer profiles, and road and location data. According to an embodiment, one or more deployments of the system 100 operating as "mini-grid" may, through use of the cloud-based service API 101, form a distributed charging network that performs one or more of a plurality of functions including, but not limited to: receive grid status and capacity data from local utility companies; receive and transmit data from $3^{rd}$ parties, for example governmental partners or data analytic companies; receive and transmit data with mobile device applications; provide a control layer that tracks power usage of the "mini-grid" in order to virtually "shift" power among and between controllers in the "mini-grid"; and transmit and receive data from local telecommunication networks.

Although having an API 101 is useful for third-party integrations, the communication method between components is not limited to APIs. In various embodiments, communication between the various components may use one or more communication protocols used in the art such as HTTP(S), TCP/IP, FTP, UDP, etc. and utilize one or more communication means such as Zigbee, MQTT, WiFi, Zwave, Ethernet, Fiber, ISDN, PTSN, Cellular Networks, Bluetooth, Asynchronous Transfer Mode, etc.

Figure 2:
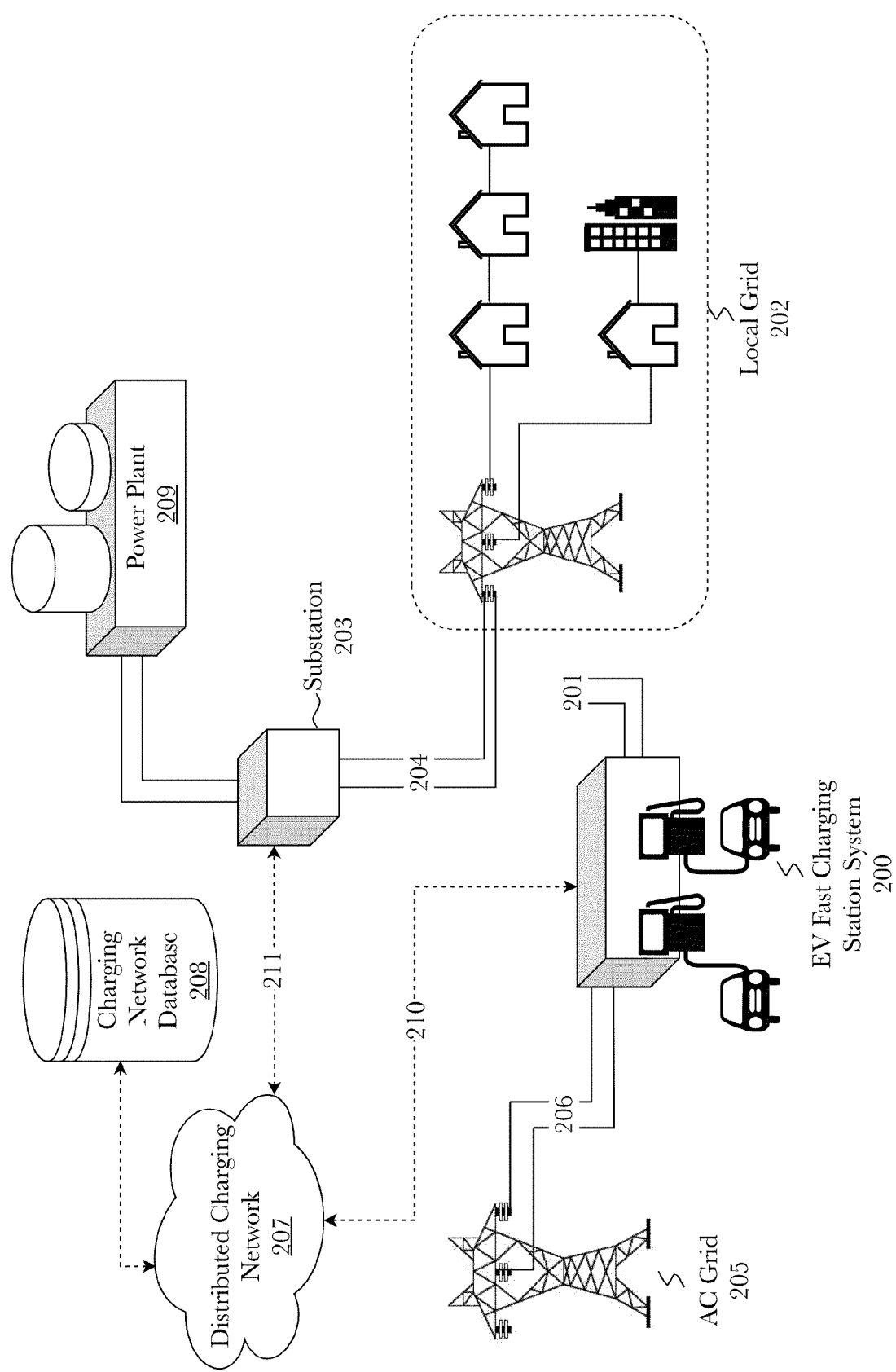
FIG. 2 is a diagram from a grid standpoint of an exemplary system for extreme fast charging for electric vehicles and distributed grid resource adequacy management operating without grid balancing.

FIG. 2 is a diagram from a grid standpoint of an exemplary system for extremely fast charging and distributed grid resource adequacy management 200 operating without grid balancing. When not facilitating grid balancing actions, the charging station system 200 operates while maintaining a connection 206 to the grid via distributionlines 205 that deliver the power required to operate the charging station system 200. The local grid 202, which may consist of homes, office buildings, industrial yards, etc., is supplied 204 power via a substation 203 that provides local area access to power that is generated at a power plant 209. The power plant 209 may generate power through any suitable practice including, but not limited to: hydroelectric, solar electric (photovoltaic), nuclear, fossil-fuel, wind, chemical, and heat (thermal) energy. According to an embodiment, the system 200 and the substation 203 both exchange data with a cloud-based distributed charging network 207 via API access 210, 211. The cloud-based distributed charging network 207 may be able to access a charging network database 208 to provide data that may be used to train, test, or trigger machine learning predictive processes or support other control operations, according to an embodiment.

One or more of a plurality of switches and circuit breakers may be contained within the system 200 to support resource adequacy management via grid balancing. When the extremely fast charging and distributed grid resource adequacy management system 200 is operating in a grid balancing off state the switches are configured in such a way to allow power to flow 206 from the low voltage AC grid 205 into the charging system 200 providing power that can be stored in a battery pack and discharged to provide extremely fast charging capabilities to EVs. The switches are controlled by a system 200 internal controller that communicates with the distributed charging network 207 that provides data about grid status and capacity information, battery status, power rates, etc. According to an embodiment, the controller uses data gathered from the distributed charging network 207 to manage and optimize energy storage and distribution when determining whether to operate in a grid balancing on or off state. When operating in the grid balancing off state the switches are configured so there is no power flow 201 from the charging system 200 in the direction of the local grid 202.

Figure 3:
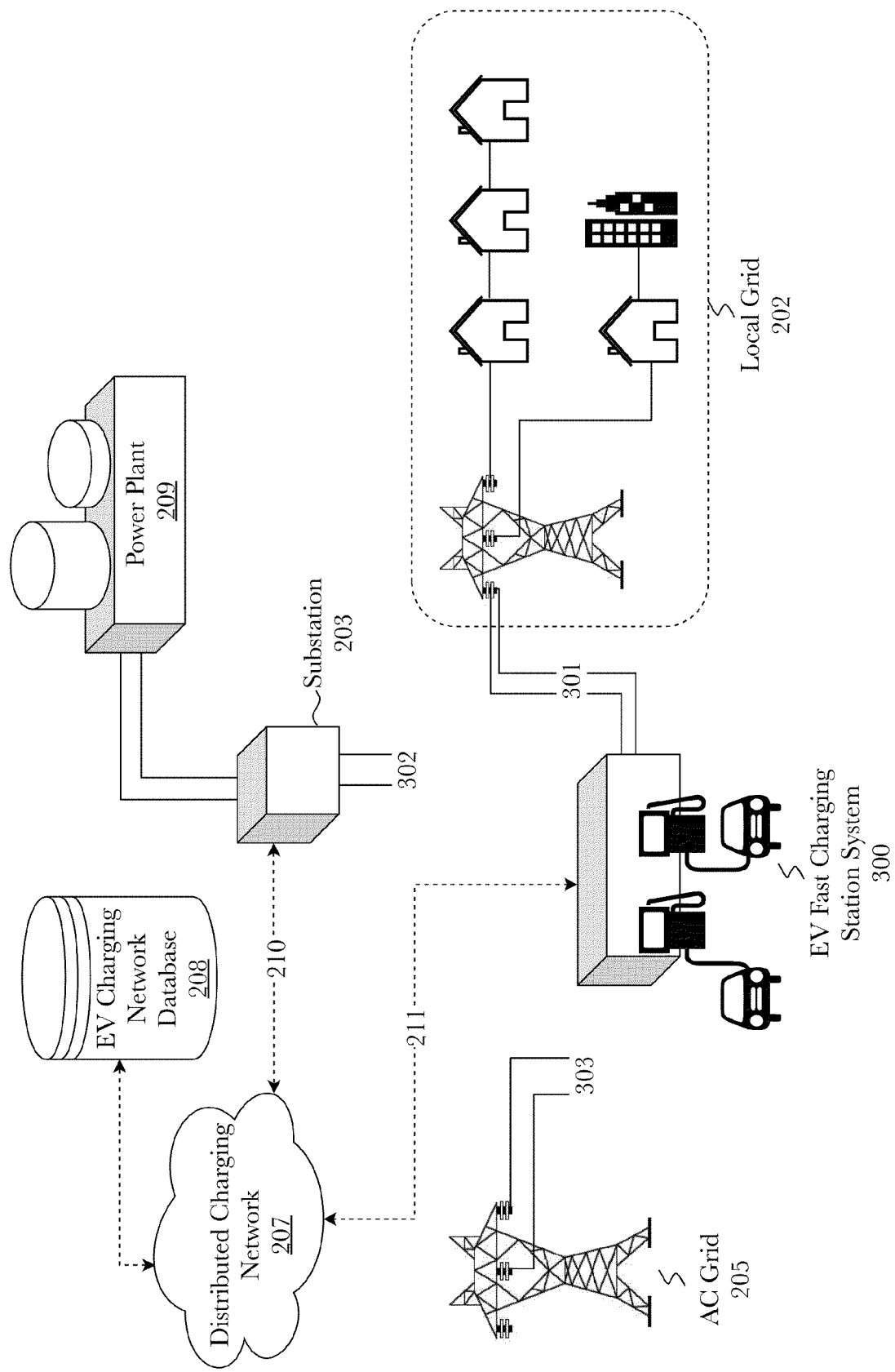
FIG. 3 is a diagram from a grid standpoint of an exemplary system for extremely fast charging and distributed grid resource adequacy management operating with grid balancing.

FIG. 3 is a diagram from a grid standpoint of an exemplary system for extremely fast charging and distributed grid resource adequacy management 300 operating with grid balancing. When the EV fast charging station system 300 is operating in a grid balancing state, the internal switches are configured in such a way to allow the system battery pack to supply 301 power to the local grid 202 via a bi-directional AC-DC converter-inverter, according to an embodiment. During grid balancing the battery pack is discharging energy, it is not storing energy, therefore the power does not flow 303 from the low voltage AC grid 205 into the charging system 300, rather it flows 301 from the charging station system 300 into the local grid 202. According to an embodiment, the charging system 300 may provide grid balancing to facilitate resource adequacy management by supplying power during peak power consumption periods at below market prices. For example, a charging system 300 may be able to charge its battery supply during off-peak hours when market rates for electric power are low. During peak power consumption periods, or periods during planned or unplanned grid shutoffs, the system can go into island mode, which means that the charging station system 300 is disconnected from the central power distribution system comprising the power plant 209, the substations 302, and transmission lines, and serves as a substation for and maintains a connection to a small local grid 202. The substation 203 and the charging system 300 are able to communicate via the distributed charging network 207 and when the charging station 300 begins to operate in the grid balancing on state, the substation 203 can shut off 302 power supply for the local grid 202 whose power needs are being supplied by the charging system 300.

Figure 4:
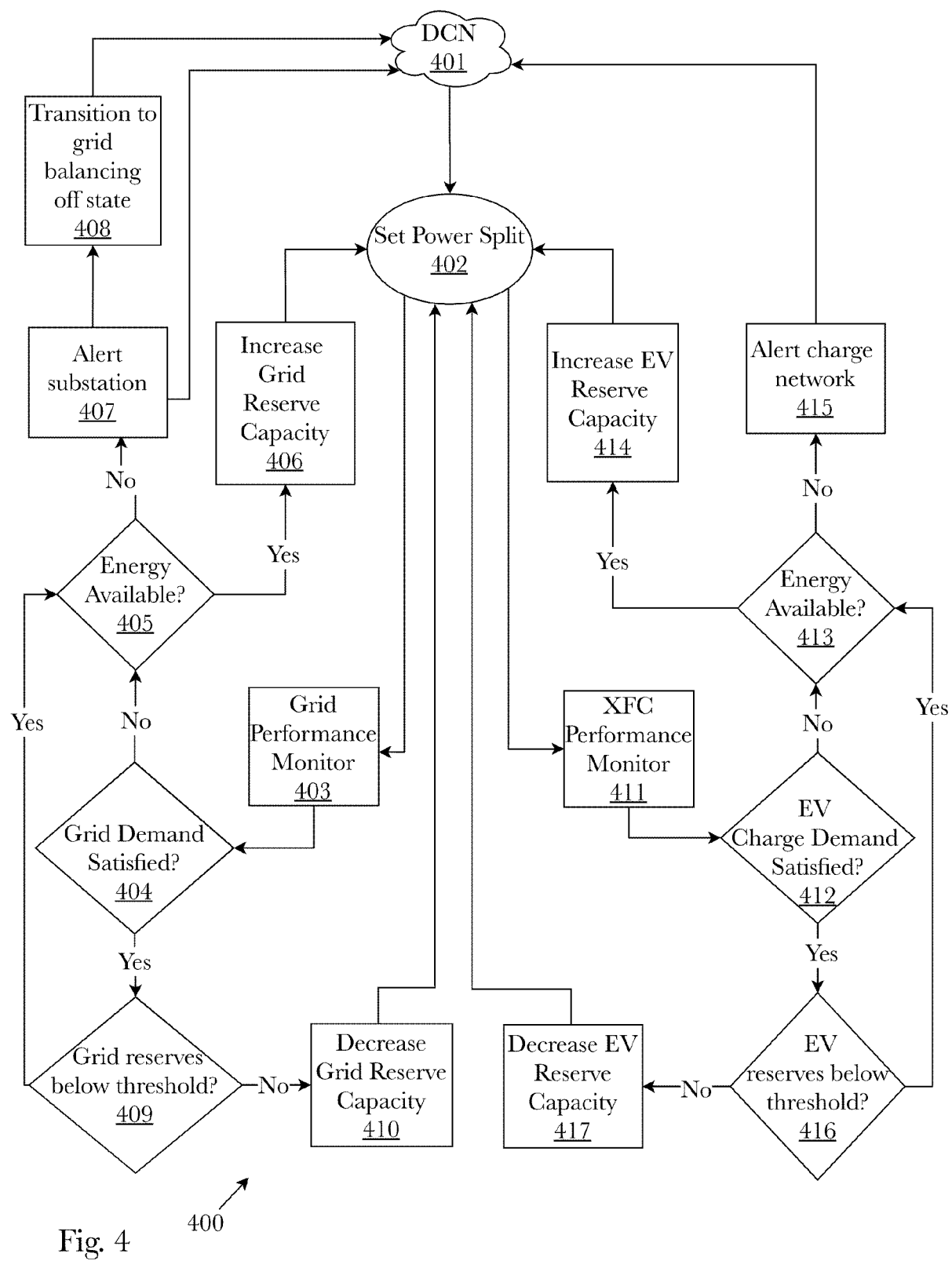
FIG. 4 is a flow diagram of an exemplary system optimization algorithm for managing the power split between grid reserves and EV charging while the charging station is operating with grid balancing.

FIG. 4 is a flow diagram of an exemplary system optimization algorithm 400 for managing the power split 402 between grid reserves and EV charging while the charging station is operating in a grid balancing on state. According to an embodiment, a controller decides the timing and destination of control signals, using data gathered via the distributed charging network (DCN) 401 to test and train machine learning predictive algorithms, to optimize the performance of various aspects of the charging station including, but not limited to: charging station-to-grid connection and interaction, its performance as "gas station" EV charging station, and its overall economic performance for the platform operator (something about battery performance). The controller receives and processes a plurality of DCN 401 data such as: grid status and capacity, battery status and lifespan, EV charging station usage, power consumption, power rates, consumer profiles, platform location, economic information, etc. According to an embodiment, the controller makes use of machine learning optimization algorithms and DCN 401 data to manage the power split 402 which is the proportion of available battery storage reserved for both grid balancing operations and EV fast charging operations. An initial power split may be determined by comparing the present states of both the grid and the charging station, as determined using the distributed charging network data 400, with similar historical states. This provides an initial, baseline power split that can be autonomously optimized for any given state of operation. The power split 402 levels are autonomously selected and the performance data of both the grid 403 and the extremely fast charging station 411 are monitored and used to fine tune optimal power split 402 levels.

A simple example of an autonomous optimization algorithm 400 that may be used within the controller of the charging system begins when an initial power split 402 level of operation is chosen for the charging system. The grid performance is monitored 403 at the chosen power split 402 level of operation. According to an embodiment, grid performance may be measured by one or more aspects including, but not limited to: grid demand, power consumption, data feedback from local utility, and capacity information. The grid performance monitor 403 may reference power demand and consumption levels on the local grid to determine if grid demand is being satisfied 404 by the current power split 402 levels. If grid demand is not being satisfied, then the next step is to use DCN 401 data relevant to battery health and status to determine if there is any available battery reserve energy 405 that can be transferred from the EV XFC reserves to the grid reserves. If there are no available reserves to be transferred, then an alert is generated 407 and sent via the DCN 401 to a substation responsible for providing power to the local grid that the charging station had just been performing grid balancing operations for, in order to ensure that the local grid has uninterrupted power access as the charging station begins to transition to a grid balancing off state 408. However, if there are available reserves that may be transferred then the grid reserve capacity will be increased 406 and the algorithm sets a new power split 402 level reflecting the increase in grid reserve capacity. If grid demand is being satisfied, the next step is to check if the grid reserves are below a predetermined threshold 409. The threshold may be determined using one or more of a plurality of metrics, for example a grid reserve threshold may be determined by calculating the amount of energy needed to power a local grid for thirty minutes at the current consumption rates. If the grid reserves fall below the threshold, the next step is determining if there is any available battery reserve energy 405 and proceed as described above. If the grid reserves are above the threshold, then the algorithm may decrease the grid reserve capacity 410 because if grid demand is satisfied and there are excess reserves such that the threshold was not crossed, then there is more reserve capacity allocated to grid operations that may be optimally used by transferring to EV XFC reserves for EV charging operations.

Continuing the simple example of an autonomous optimization algorithm 400, the EV fast charging station performance is monitored 411 at the chosen power split 402 level of operation. According to an embodiment, EV fast charging station performance may be measured by one or more aspects including, but not limited to: power rate, charge demand, data feedback from station users, and battery status. The XFC station performance monitor 411 may reference charge demand and consumer data to determine if charge demand is being satisfied 412 by the current power split 402 levels. If charge demand is not being satisfied, the next step is to check if there are available energy resources 413 that may be transferred from the grid reserves to the EV fast charge reserves. If there are no available reserves to be transferred, then an alert 415 is sent to the DCN 401 which can alert potential charge station users via a DCN 401 connected application or device that a charge station is currently unavailable for charging operations. However, if there is available energy that may be transferred then the EV reserve capacity will increase 414 and the algorithm sets a new power split 402 level reflecting the increase in EV reserve capacity. If EV charge demand is being satisfied, the next step is to check if the EV reserves are below a predetermined threshold 416. The threshold may be determined using one or more of a plurality of metrics, for example an EV reserve threshold may be determined by calculating the amount of energy needed to charge two vehicles. If the EV reserves fall below the threshold, the next step is to check if there are any available energy resources 413 and proceed as described above. If the EV reserves are above the threshold, then the algorithm may decrease EV reserve capacity 417 because EV charge demand is satisfied and there are excess reserves such that the threshold was not crossed, then there is more reserve capacity allocated to EV operations that may be optimally used by transferring to grid reserves for grid balancing operations. By iterating through the simple example optimization algorithm 400 the charging station is able to learn to set the power split 402 in various configurations to optimize both grid balancing and extremely fast charging operations.

As another example, an optimization algorithm may process both real-time and past power consumption data to identify trends in power consumption (e.g., on and off-peak hours) for a local grid system, coupled with charging station usage data to determine the optimal proportion of power split 402 between grid reserves and EV fast charging. The optimization algorithm may determine that splitting the battery capacity to 30% grid reserves and 70% EV fast charge reserves is optimal during off peak hours, but during on peak hours the split is determined to be 75% grid reserves and 25% EV XFC. The charging system optimization algorithm learns from experience by setting a power split 402 level and, during a period of time, monitoring 403, 411 and recording the performance (metrics) of the charging system vis-a-vis the grid, using the increase or decrease in performance (metrics) to determine the optimal power split level during the period of time. The charging system may determine, over time as the machine learning process trains the optimization algorithm, the optimal power split 402 that provides adequate grid reserves, enables a user friendly "gas station" EV fast charging station experience for consumer or fleet applications, and optimizes economic outcomes of the charging station operator (owner), the local utility company, and the user.

Figure 9:
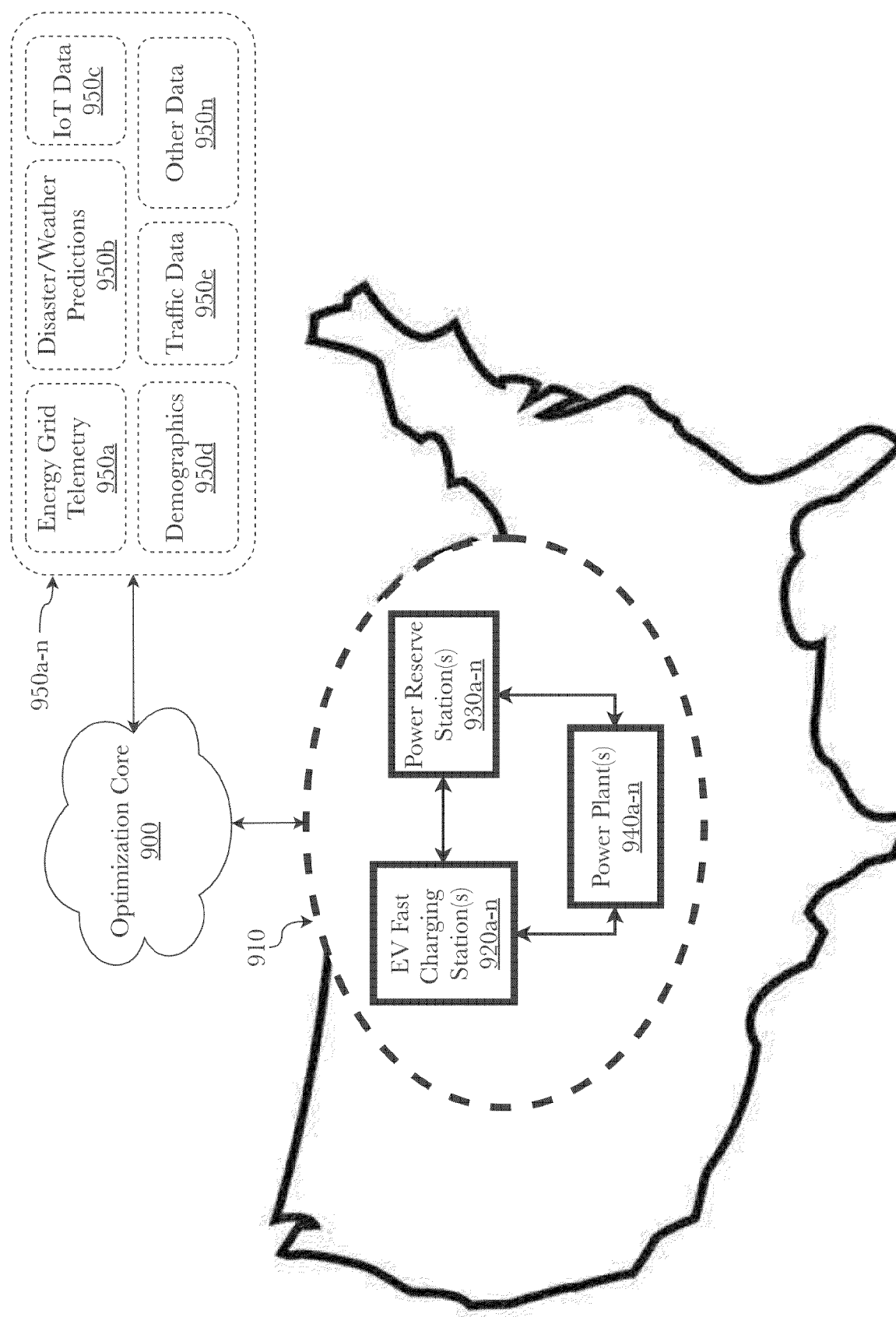
FIG. 9 is a diagram of an exemplary system architecture for a platform providing for a resilient and fortified electrical grid system.

FIG. 9 is a diagram of an exemplary system architecture for a platform providing for a resilient and fortified electrical grid system. The system comprises an optimization core 900 which is a cloud-based machine learning service that manages the strategic siting of stored power for use in managing and mitigating energy scarcity and disruption within an electrical grid 910. Optimization core 900 does so by ingesting a plurality of data 950*a-n* into one or more machine learning neural networks to identify optimal energy storage siting locations.

As at least FIG. 1 through FIG. 4 describe one or more energy storage devices (See at least components 100, 200, and 300), some of which function as EV charging stations, the energy storage devices according to this embodiment comprise one or more EV charging stations 920*a-n* and one or more power reserve stations 930*a-n*. Power reserve stations 930*a-n* may be configured similar to an EV charging station as described in FIG. 1 through FIG. 4 but without EV charging outlets 160. The purpose of power reserve stations 930*a-n* is to store energy in strategic locations for use in distributing power when and where needed—not only for charging vehicles, but any power need. However, it is entirely possible to implement such a system as disclosed herein without power reserve stations 930*a-n* because charging stations 920*a-n* as described herein would make power reserve stations 930*a-n* redundant granted there was a sufficient amount in the needed locations. The electrical grid 910 according to this embodiment is made up then of the current components (e.g., power plants 940*a-n*, feeder networks, etc.) and energy storage devices (e.g., EV charging stations 920*a-n* and (optional) power reserve stations 930*a-n*).

Optimization core 900 ingests data from power grid components (e.g., telemetry 950*a* from EV charging stations 920*a-n*, power reserve stations 930*a-n*, utility companies, network-connected devices, power plants 940*a-n*, etc.) and from data available from public and private data banks. Data of the former helps identify regions with frequent network outages and compare it to unfulfilled grid capacity in corresponding stations 920*a-n*/930*a-n*. Some examples of the latter data comprise disaster/weather predictions 950*b* (fire hazard information), IoT data 950*c* (e.g., network-connected sensors and devices), demographics data 950*d* (equity indicators), traffic data 950*e*, and other data 950*n* such as Big Data.

The importance of disaster weather predictions 950*b* is that often events such as wildfires and hurricanes cause disruptions in power distribution, and forewarning of such events may allow optimization core 900 to strategically reallocate stored energy between energy storage devices (EV charging stations 920*a-n* and power reserve stations 930*a-n*) where such energy storage devices will be able to distribute electricity in the event the main supply (power plant(s) 940*a-n*) is disrupted. Additionally, optimization core 900 may perform cost-benefit analysis in order to determine the exact ratio of and location of energy. Demographics 950d, location-based or context-based data (such as annual events (i.e., tourism seasons)), traffic and map data 950c may all further inform optimization core 900 as to the demand and susceptibility of one or more local grids. As typical of machine learning, the more data ingested the better predictions become.

Figure 10:
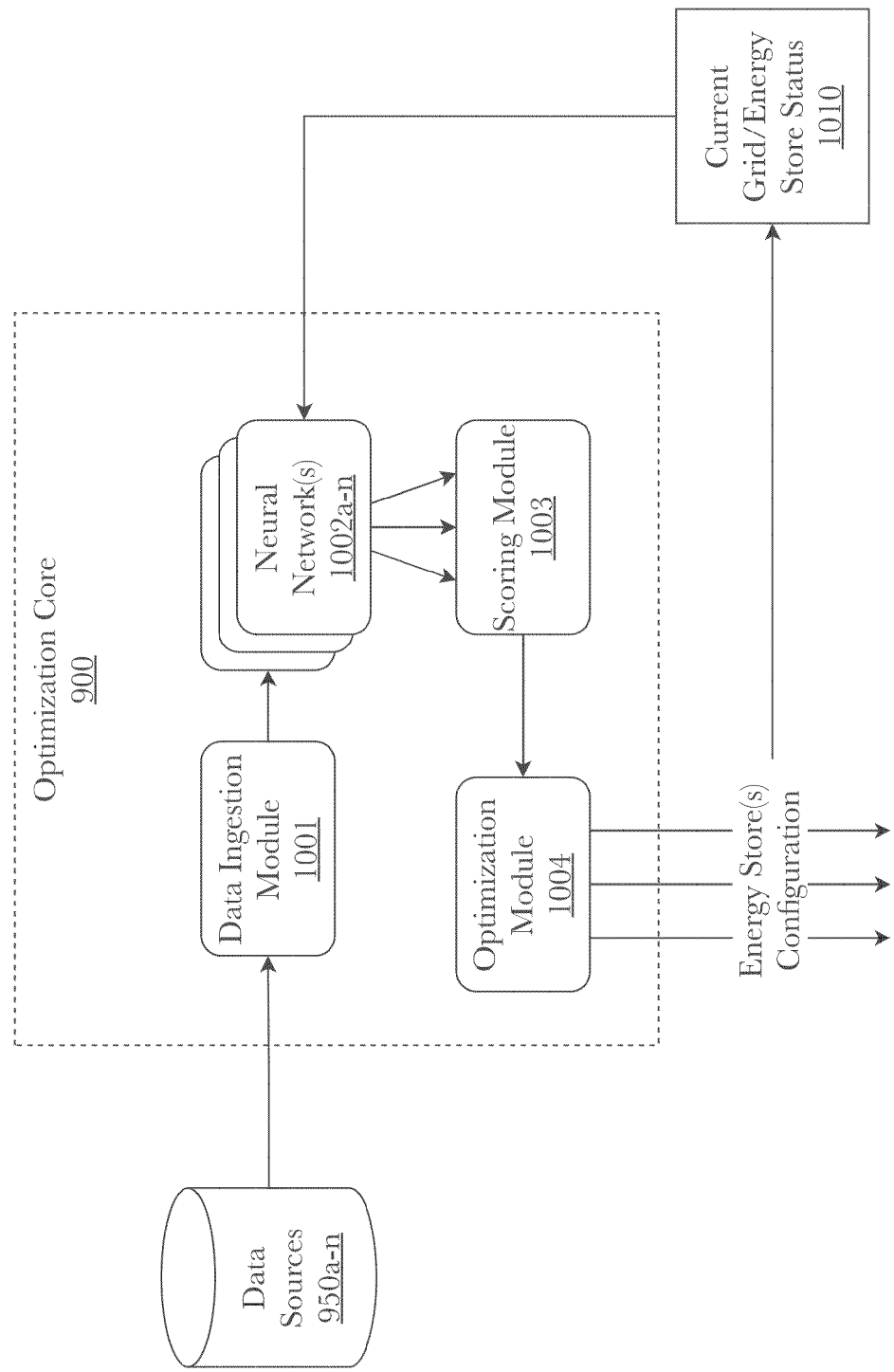
FIG. 10 is a diagram of an exemplary system architecture for an optimization core used in a platform providing for a resilient and fortified electrical grid system.

FIG. 10 is a diagram of an exemplary system architecture for an optimization core 900 used in a platform providing for a resilient and fortified electrical grid system. Optimization core 900 comprises a data ingestion module 1001 that performs data cleansing and preprocessing before one or more pluralities of data 950a-n is ingested through nonparametric or parametric classification methods into one or more machine learning neural networks 1002a-n. Various embodiments are anticipated where data 950a-n is cleaned and preprocessed before entering the optimization core 900, however the preferred method would be done automatically by the optimization core 900. As known to those with at least ordinary skill in the art, many machine learning models may be used in parallel, in place of, or in addition to those disclosed herein. A k-nearest neighbors model and neural networks approach is suggested here by way of example but is not to be interpreted as to limit the claimed invention to a k-nearest neighbors model, one or more neural networks, or any other machine learning model for that matter. Other better performing optimization models may be used as appropriate with continued tuning.

According to one embodiment, an ensemble of k-nearest neighbors neural networks are utilized for calculating a grid risk score, climate risk score, socio-economic score, and location score for some region in space. Regions may be configured to any desired parameters, whether that be State, County, City, feeder network, socio-economic status, or any other partitioning criteria deemed fit. The data for neural networks comes from, but not limited to, external data sources 950a-n/1010 as disclosed in FIG. 9. Each neural network calculates a score for its respective features and passes the score along to a scoring module 1003. The scoring module 1003 may sum each region's score which is then used along with other region's scores by an optimization module 1004 to reallocate or reconfigure the storage of energy for the grid. The summing of scores may also be fed back into one or more neural networks. These one or more neural networks may learn which scores are more important than others—based on parameters such as certain demographic properties or infrastructure condition—and improve each iteration's prediction as to the status and reallocation of the grid. Optimization module 1004 may also use machine learning to predict the most optimized distribution and use of energy in the grid. Neural networks used in score summing and optimization may be better suited with other algorithms such as support vector machines (SVM) depending on the number of inputs, which may be limited to a handful of regional scores. According to another embodiment, one neural network may be used for all regional scoring, score summing, and optimization. Once an optimal distribution and configuration of energy on the grid is determined, optimization core 900 sends out updated energy store configurations which instruct each energy store in the grid to either store more energy, release energy back into the grid, or maintain its current level of energy.

Another embodiment removes the neural network(s) and performs the same functions as described in the above paragraphs with only a k-nearest neighbors model. Yet even more embodiments may employ a k-means algorithm, support vector machines, logistical regression, various clustering algorithms, and other machine learning models well-known in the art.

Figure 11:
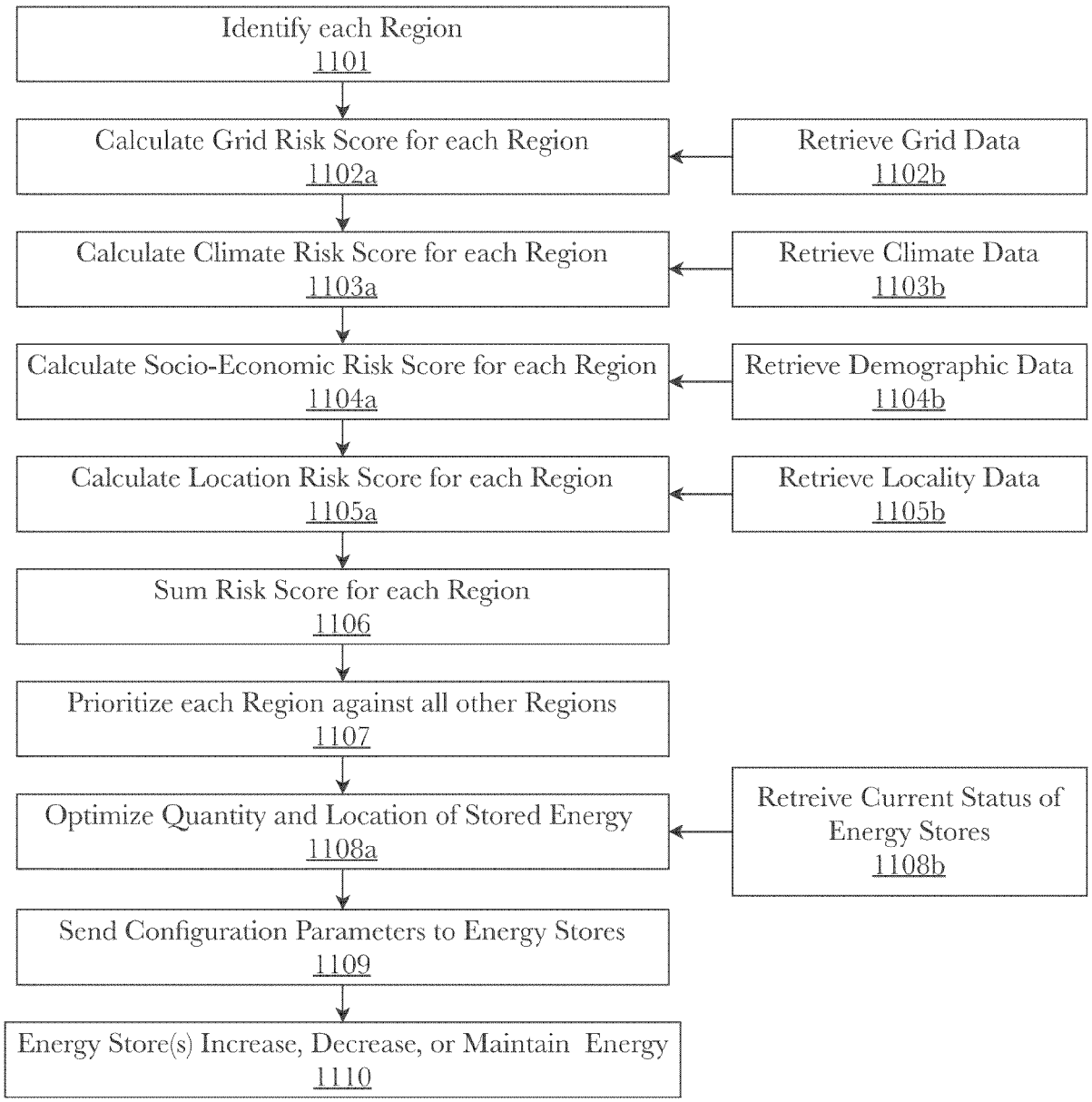
FIG. 11 is a flow diagram of an exemplary method for providing for a resilient and fortified electrical grid system.

FIG. 11 is a flow diagram of an exemplary method for providing for a resilient and fortified electrical grid system. The exemplary method comprises a first step of identifying each region 1101. Subregions (regions within regions) may also be identified as regionality is decided, or at least first configured, by a user. Meaning, that regions can be automatically determined or manually determined. Either way, regions may comprise the people, places, and things spatially constrained by some objective measure. One example may be to compartmentalize a city by neighborhoods. Each neighborhood comprises the electrical grid components that service that neighborhood, the data about the homeowners/renters of that neighborhood, and other public private data regarding each neighborhood. A second example is to make each feeder network a region, and subsequently assign geographically relevant data to each feeder network region. Utility companies may determine other more productive factors in determining the best regions than say a military installation. Each region may be configured or constrained by the implementor.

Steps 1102a-1102b involve ingesting grid telemetry data, utility company data, infrastructure data, historical outage data, and other data relevant to the electrical grid and using that data in a neural network to determine a grid risk score for that region. Steps 1103a-1103b involve ingesting historical and predicted local weather data, historical and predicted climate change data, historical and predicted natural disasters, and other data relevant to climate/weather and using that data in a neural network to determine a climate risk score for that region. Steps 1104a-1104b involve ingesting education data, employment data, income data, community data, and other data relevant to socio-economic factors and using that data in a neural network to determine a socio-economic risk score for that region. Steps 1105a-1105b involve ingesting foot traffic data, vehicle traffic data, GIS data, real estate data, business data, and other data relevant to location and using that data in a neural network to determine a location risk score for that region. Each region's grid score, climate risk score, socio-economic risk score, and location risk score may be combined for a total risk score representing that region 1106. It is anticipated that a neural network may be utilized to adjust the weights of each risk score as the machine learning modules learn to better predict optimizations 1107/1108a-b of the grid. For example, a high climate risk score—indicating an imminent disaster—is more pertinent in a cost-benefit analysis than a low location risk score— indicating a higher profit margin and increased demand, according to one embodiment.

Some regions make up larger regions, thus subregion scores may be summed to form the risk score of a larger region. Regardless of the scale of the regions or subregions, a next step entails determining which regions need energy more than other regions 1107, as in the high climate risk score/low location score example. With prioritizations determined, the actual availability of energy, current demand of energy, and status of stored energy is used to optimize a new configuration of stored energy in the energy storage stations across the considered regions 1108a-b. The updated configuration parameters set forth by the optimization is sent over a network to the energy stores 1109 such that the energy stores receiving the updated configuration parameters will begin to increase the amount of energy stored, release energy back into the grid, or maintain the level of energy already stored 1110.

Figure 12:
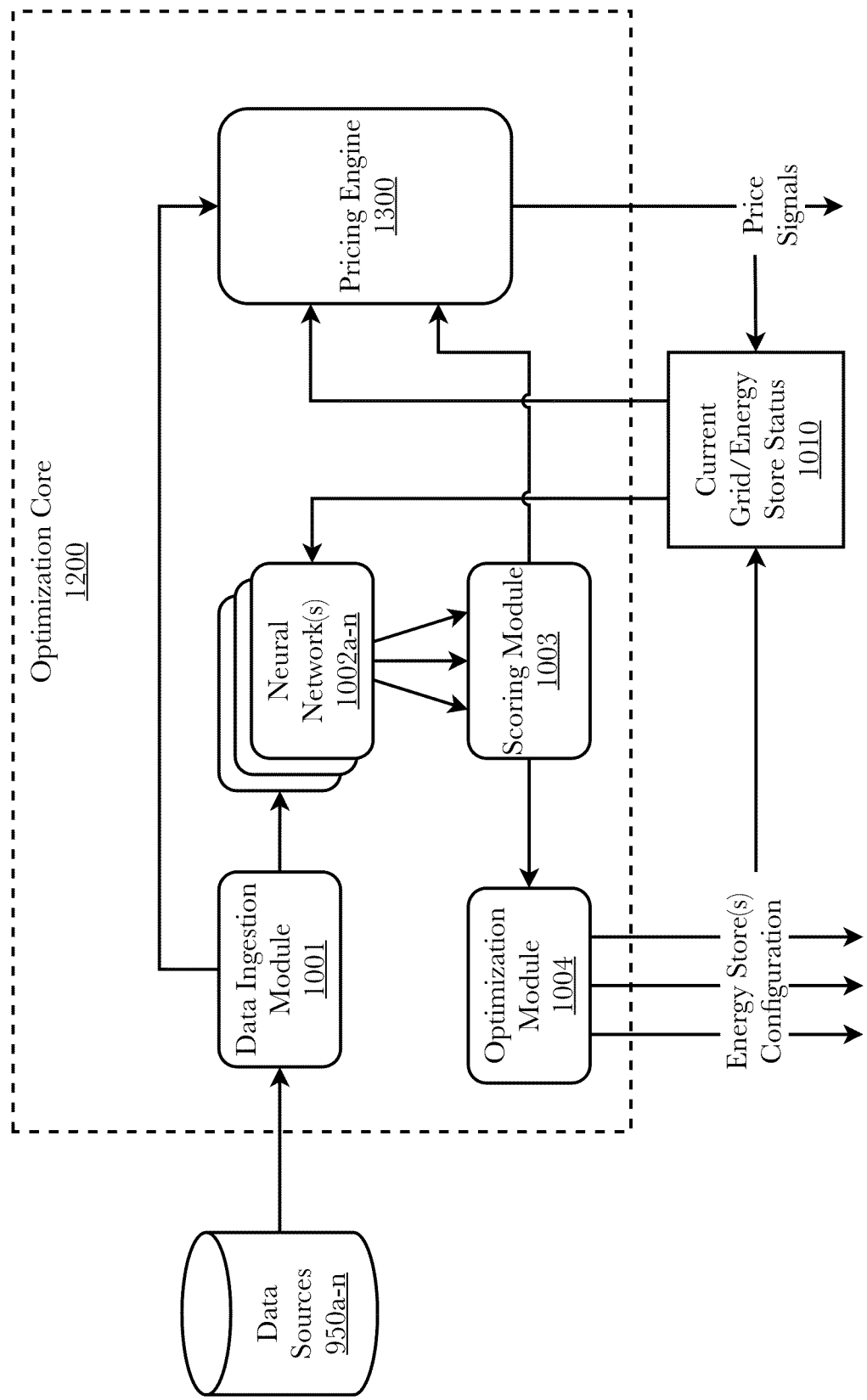
FIG. 12 is a block diagram illustrating an exemplary system architecture for an optimization core used for real-time micro-grid optimization via price signals.

FIG. 12 is a block diagram illustrating an exemplary system architecture for an optimization core used for real-time micro-grid optimization via price signals. The system provides for the optimization at a local level (e.g., per individual distributed energy resource [DER]) and at a global level (e.g., a network of DER), by predicting, forecasting, and managing an electrical system state of charge and demand for each DER in a network, grid, microgrid, etc. Using the calculated risk scores and configuration parameters generated by optimization core (referring to FIGS. 10 and 11), the real-time micro-grid optimization system can determine how pricing varies temporally and spatially as each DER in the network is a function of where it is located and also a function of time as risk, demand, and energy storage values vary over time. The computed risk scores use data intelligence to optimally operate DER (e.g., components 100, 200, and 300, level 2 and level 3 standalone EV charging systems, energy storage devices, solar arrays, etc.) with regional specificity. The current implementation of optimization core 1200 extends the risk score and DER optimization by using artificial intelligence (AI) to predict what optimal price signals should be with similar specificity. That is to say, price signals can be generated at various levels of granularity: at a local level such as on a per DER basis or on per neighborhood or county level; and at a global level such as an entire grid or microgrid, or across an entire network of DER such as a network of EV charging systems described herein.

One objective of the disclosed system and methods is to estimate the potential benefit of using distributed battery energy storage systems (BESS) to support EV DCFC with energy storage value stacking. Energy storage systems can maximize their value to the grid and project developers by providing multiple services. As some services are rarely called for or used infrequently in a given hour, designing BESS to provide multiple services can enable a higher overall battery utilization that improves project economics. This multi-use approach to energy is known as value stacking. For example, a BESS project can help defer the need for new transmission by meeting a portion of the peak demand with stored energy during a select few hours in the year. When not meeting peak demand, the BESS can earn revenue by providing operating reserve services for the transmission system operator. This can support opportunities for EV fast charging by avoiding high time-of-use (TOU) or peak demand charges, while also contributing to grid reliability and resilience with ISO/RTO and utility services such as regulation or resource adequacy.

The unit compensation cost for resource adequacy (RA) can be obtained from the 2021 Resource Adequacy Report filed by the California Public Utilities Commission Energy Division. It is assumed that contracts are made monthly and thus obtain both the weighted average and 85$^{th}$-percentile compensation price in $/kW per month for the Bay Area in each month of the year. However, since scenarios may arise wherein the electricity price in certain hours of the day is high such that it is more profitable to trade contract-committed capacity, it is important to keep track of the penalties for breaking these RA contracts, as these will have a direct impact on the revenue generated during these certain hours of the day.

According to various embodiments, a pricing engine 1300 is present and configured to receive a plurality of data from various data sources, including disparate, real-time datasets of spat iotemporal information, use one or more machine and deep learning techniques to spatially and temporally align the disparate datasets as well as to predict the optimal price signals for one or more DER operating at a given location or within a specified region. Pricing engine 1300 may take in as inputs the following, non-exhaustive list comprising, information from data sources 950a-n, electrical market data (e.g., current and day ahead prices, energy contracts and exit penalties, etc.), simulation data, grid impact data, air quality data, travel demand data, equity considerations, locational data, state of charge data, and profit/cost data. Furthermore, pricing engine 1300 may also receive the computed risk scores and configuration parameters (see FIG. 11) and use this information as inputs, in addition to the above mentioned data inputs, into pricing engine 1300, which can in turn perform data transformation and analysis functions in order to output optimal, real-time price signals for one or more DER. The prediction of such optimal price signals may be used, in conjunction with the risk scores and configuration parameters, to form a new metric referred to as 'granular grid vulnerability' which is grid/micro-grid level metric that identifies how real-time risk and value may be used in price assessment. Additionally, granular grid vulnerability metric may be used to determine how pricing varies temporally and spatially across a region, grid, micro-grid, DER, etc. Furthermore, granular grid vulnerability can be thought of as a measure of the resilience of a system (e.g., single DER, group of DER, grid, micro-grid, etc.) to be able to support demand and ancillary grid services (e.g., frequency regulation, voltage regulation, etc.). If resilience is diminished, then that represents a potential vulnerability in the system.

Another feature of the system is that it can offer hierarchical and distributed pricing. This can be used to form a new equilibrium in demand, storage, and revenue. For example, a group of smaller local networks (i.e., micro-grids comprising one or more DER) may be concatenated into larger private market networks which can then benefit from economy of scales in order to increase revenue, alleviate demand, and transfer energy between and among DER in the concatenated network. The predicted optimal price signal may be used to drive the movement (e.g., charge or discharge) of energy from one point to another within a given region, local market, or concatenated market. More specifically, a delta-P (i.e., change in price signal) can be used to drive the movement of energy across DER. For example, consider a local network wherein the current state of the network is known, there is an action that is needed (e.g., frequency regulation, EV charging, etc.), and the system needs to reward the correct action. In this example, the pricing engine 1300 can define local price signals (rewards) on the network. A local optimization computes a new state for each DER and also recomputes what the state should be across the entire network. Because optimization core 1200 is managing energy within a local network, a local market is created. This defines local prices that interact with the outside grid, and drive economic and physical performance of the controlled micro-grids and the distributed DCFC charging stations as a whole.

Predicted optimal price signals can be used to facilitate energy arbitrage between the system and an utility company and/or energy wholesale market. For example, the price signals indicate that it would be more profitable for a given DCFC charging station to sell some amount of stored energy during peak hours than it would be to reserve that amount of energy for EV charging. Pricing engine 1300 may be leveraged to predict what pricing should be in the future of the grid based on real-time data and historical data that may be obtained from the distributed DER (e.g., DCFC charging stations), which provide local measurements of the local grid conditions in the form of rich data in real-time, and from other data sources such as those described above. For example, if there is a local arbitrage opportunity because local electric prices are high, the system can use internal price signals to move energy to the local grid to offset the high price.

Figure 13:
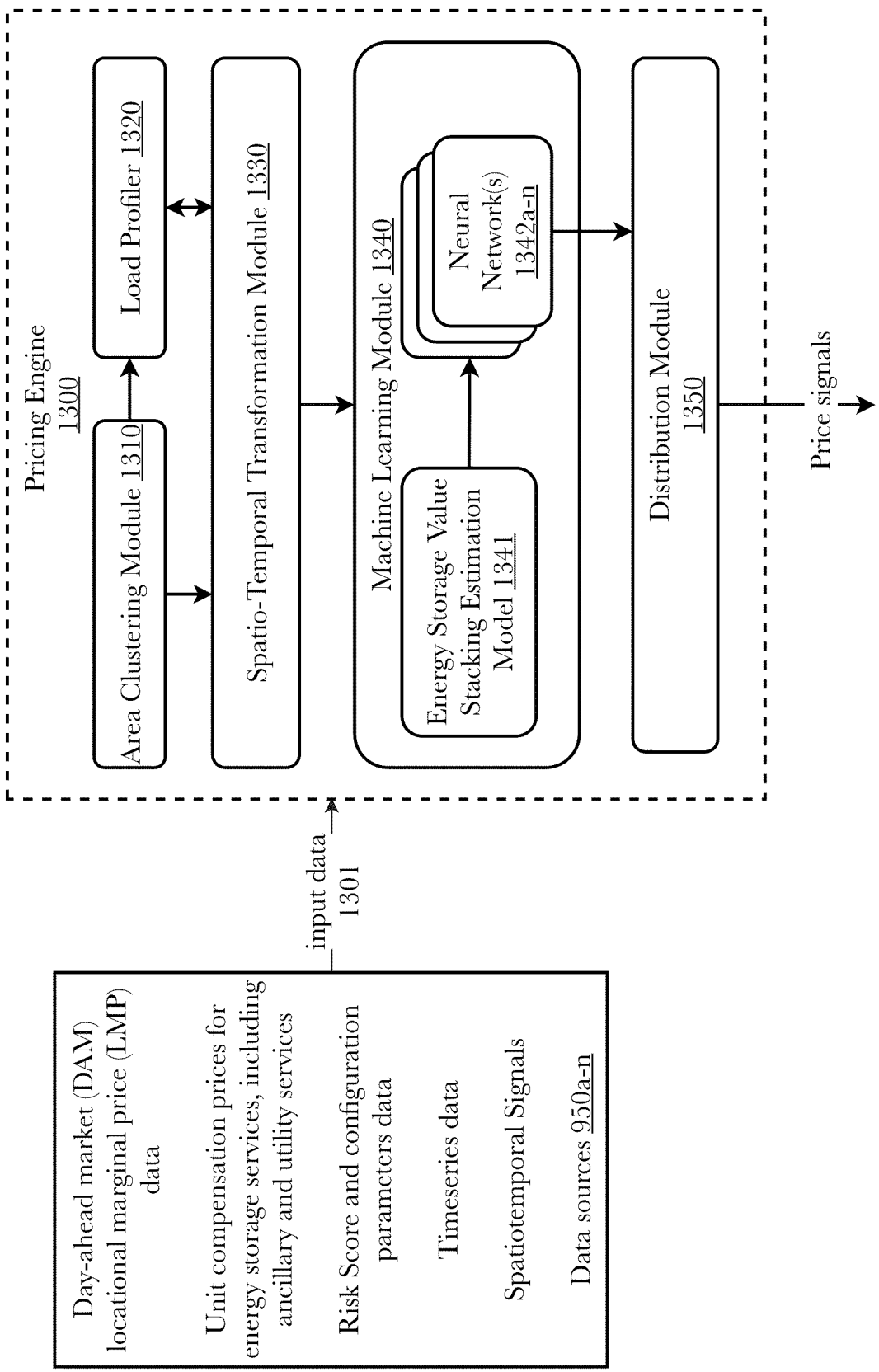
FIG. 13 is a block diagram illustrating an exemplary aspect of a system for real-time micro-grid optimization via price signals, a pricing engine.

FIG. 13 is a block diagram illustrating an exemplary aspect of a system for real-time micro-grid optimization via price signals, a pricing engine 1300. Pricing engine 1300 is configured to construct and maintain a spatiotemporal AI to predict spatiotemporal effects of availability of electricity and optimal price signals to drive the operation of a network of DER and grid resources. According to the aspect, pricing engine 1300 comprises an area clustering module 1310 configured to receive a plurality of real-time and historical spatiotemporal data and to identify and define areas (e.g., regions/subregions) by spatially aligning datasets by converting electrical line data into spatial data, a load profiler 1320, a spatiotemporal transformation module 1330 configured to receive a plurality of real-time and historical spatiotemporal data, construct and maintain a deep learning model, and use the model to exploit spatial and temporal relationships across disparate datasets to create large amounts of information-rich contextual data, a machine learning module 1340 which constructs and maintains and energy storage value stacking estimation model 1341 and one or more neural networks 1342*a*-*n* configured to predict optimal price signals for one or more DER, region, grid, micro-grid, etc., and an distribution module 1350 which sends out updated price signals to appropriate network endpoints (e.g., edge controllers, DER, DCFC charging stations, level 2 charging systems, etc.).

In some implementations, area clustering module 1310 may implement a clustering area gravity model for spatially aligning datasets or converting electrical line data into spatial polygon data. A gravity model can be used to predict and describe certain behaviors that mimic gravitational interaction. A gravity model provides an estimate of the volume of flows of, for example, electrical energy or traffic flow, between two or more locations. A gravity model may be used to describe the flow of electricity between two or more regions in which the risk score is computed in order to spatially align datasets from the two or more regions. According to some aspects, clustering area gravity model may use a plurality of data as input including, but not limited to: grid impact (e.g., integration capacity analysis, regional distribution grid capacity, etc.) which quantifies the maximum amount of power that can be injected into, and drawn from, the distribution system requiring minimal to no distribution upgrades or operational restrictions; air quality (e.g., energy assessments division GHG emissions factors) which is used to estimate indirect emissions from electricity purchases; travel demand (e.g., alternative fuels data center, existing infrastructure environment, etc.); equity considerations (e.g., SB 1000, disproportionality assessment/equitable accessibility, etc.), and value of smart-charging solutions (e.g., location affordability index which is a source of standardized data at the neighborhood level on combined housing and transportation costs, wherein a higher index number indicates that more households can afford to purchase a home). These inputs and more may be used to identify and define a plurality of traffic analysis zones (TAZ) within a given geographic region. A TAZ can have size and shape constraints such as, for example, origin-destination (O-D) trip totals, intra-zonal trip minimization, and high statistical precision. Bounded by these constraints, the TAZ definition and identification process produces desired outcomes such as, for example, similar trip quantities across all TAZs, low relative statistical error, TAZ density is proportional to O-D amounts. By defining a plurality of TAZs geospatial analysis can be conducted. For example, the number of TAZs in a county directly correlates to the volume of traffic, wherein more TAZs correlates to a higher travel volume. For each of these defined TAZs, a load profile may be determined as discussed herein and used as an input to determine the maximum revenue associated with the TAZ.

In some aspects, pricing engine 1300 may send the identified and defined TAZs to the neural networks 1002*a*-*n* which can use the TAZs to define the regions wherein the risk scores may be computed. In some aspects, area clustering module may define areas by bifurcating locations based on demand and/or affluence, or based on average waiting times in each area.

A identified and defined TAZ may be sent to load profiler 1320 which can identify locations of interest (e.g., DCFC charging stations, level 2 charging stations, DER, etc.) within the defined TAZ and determine a load profile for each of the locations of interest. In some embodiments, the TAZ information may comprise GPS coordinates that define the boundary of the TAZ, and load profiler 1320 may use these coordinates to identify locations of interest. In some embodiments, the load profile for each location of interest may be aggregated to form a load profile for the entire TAZ. In some embodiments, the load profile may comprise information about the volume of vehicular traffic and EV charging demand at a location of interest such as a DCFC charging station. In other cases, a load profile may comprise information about industrial load and demand needs such as, for example, in a TAZ that encompasses an industrial area wherein energy demand and network regulation are paramount for the operation of the industries in the industrial location.

In a specific, exemplary use case, the inventors envision these storage/charging units (e.g., at least components 100, 200, and 300) at public, easily accessible locations that are open to an urban driver on-the-go, such as gas stations, in private fleet depot or charging hub locations, or in disaster-prone areas requiring disaster relief and/or storm hardening support. Thus, in order to estimate the demand profile for EV charging over the day, assumptions about EV traffic flow through such a location, as well as the EV battery charging capacity is required. One way to model this is by estimating the average daily traffic flow through such a gas station at a location of interest, and scale that in each hour by drawing from distributions for the probability of the vehicle being an EV, and the probability that it has some specified range of charging capacity in each hour. In this manner, daily traffic flow data from a gas station in Santa Clara county can be obtained. This data may be used, with an assumption of 15% EV penetration of all vehicles arriving at the charging station, to generate a load profile as shown in FIG. 14.

Figure 14:
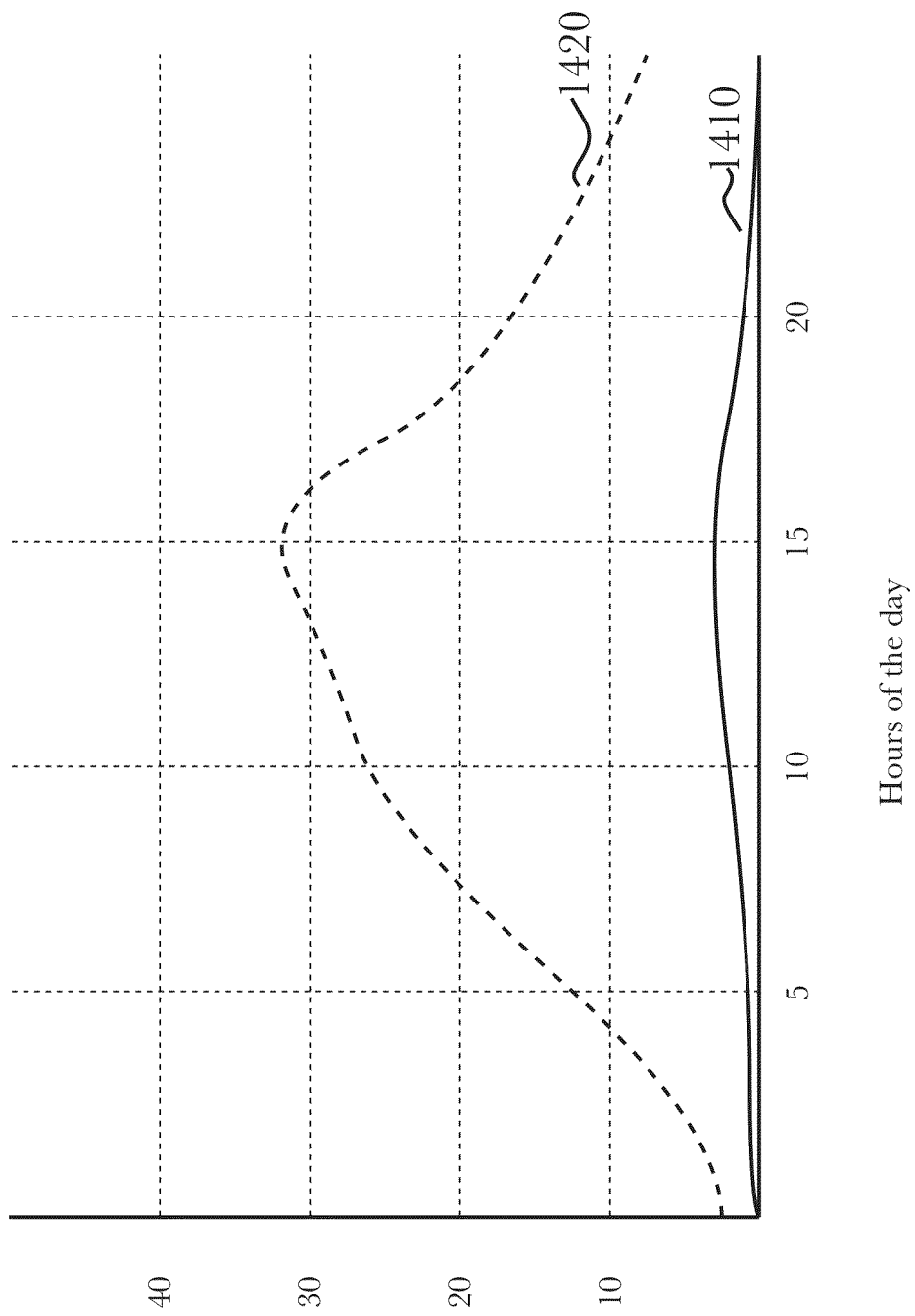
FIG. 14 is an exemplary load profile that was generated for a single gas station.

Referring now to FIG. 14, a load profile is shown that was generated for the gas station in Santa Clara county. A shown, the load profile may be visualized as a graph with two lines: the dark, non-dashed line 1410 represent the estimated number of EVs per hour which will stop at the gas station; while the other dashed line 1420 represents the load profile shown as the amount of sold energy in kWh at each hour of the day. In this manner, load profiler can construct a load profile for a given location of interest based upon real-time and historical spatiotemporal information with some built in assumptions. In cases where there is not sufficient data to determine a load profile for a location, the existing load profile data may be sent from load profiler 1320 to spatiotemporal transformation module 1330, which can use machine learning to identify relationships between spatial and temporal information in order to output context-rich information that can be used by load profiler to infer or derive information about a given location which may not have had information initially available. For example, if there is load profile information for two out of three charging stations in a TAZ, then the two load profiles can be used by spatiotemporal transformation module 1330 to determine a load profile for the third charging station based on the learned relationships from the data from the two other stations.

It should be appreciated that as more DCFC charging stations, level 2 charging stations, and other types of DER become more ubiquitous, the data telemetry gathered from such systems can be used to inform load profile generation in real-time.

Other charging/load profile input data may be used in place of, or in conjunction with the data described above. For example, fast charging profiles from EVGo charging stations available publicly as published by the California Public Utilities Commission can be used as an initial dataset, supplemented with real-time and historical charge, profit, and demand data gathered from the distributed network of DCFC EV charging stations, when creating charging/load profiles for a given location of region/subregion. In this way, not only are the risk scores for a given region or subregion computed, but also a state of charge and load profile can be determined for each unit in a region or for each region itself. Another source of input data may be simulated data from SLAC-GISMO's SCRIPT tool.

According to an embodiment, spatiotemporal transformation module 1330 may receive a plurality of preprocessed data 950*a-n*, disparate datasets containing spatiotemporal data, TAZ information, and load profile information, and analyze the data via various methods and techniques in order to generate context rich information from spatial and temporal aligned data. This context rich information can be used to supplement datasets that do not have as much information regarding traffic flow, prices, load profiles, EV penetration, capacity, and the like. To support this functionality the various analytical methods and techniques may comprise one or more machine learning methods, models, and/or algorithms. Historically, datasets are sparse and unevenly distributed over locations and time, therefore most existing models only focus on labeled locations. In an embodiment, spatiotemporal transformation module 1330 uses machine learning to spatially align disparate datasets from a plurality of distributed locations (e.g., battery energy storage systems, power reserve station(s) 930*a-n*, EV fast charging station(s) 920*a-n*, level 2 EV charging systems, etc.) that may not necessarily be labeled. In addition, spatially aligned data may be used to construct and maintain load/charging profiles for individual units, locations, and/or regions. Data may be spatially aligned via one or more parameters. For example, data may be spatially aligned by bifurcating locations based on demand and/or affluence, by new area cluster creation (e.g., using hexagonal breaks or a gravity model), or by the average waiting times in each area. Spatiotemporal transformation module 1330 may also temporally align disparate frequencies of datasets. For example, it may align hourly data, day ahead data, weekly data, and monthly data, in order to provide real-time data and analysis thereof.

According to an embodiment, system spatiotemporal transformation module 1330 may utilize deep learning (DL) techniques for spatiotemporal prediction of traffic, energy, and demand data. This proposed approach has two key advantages. First, the decomposition of the spatiotemporal signal data into fixed temporal bases and stochastic spatial coefficients allows to fully reconstruct spatiotemporal fields starting from spatially, irregularly distributed measurements. Second, while the spatial predictions of the stochastic coefficients can be performed using any regression algorithm, DL algorithms are particularly well suited to solve this problem thanks to their automatic feature representation learning. Furthermore, such a deep learning network is able to capture non-linear patterns in the data, as it models spatiotemporal fields as a combination of products temporal bases by spatial coefficient maps, where the latter are obtained using a non-linear model. Finally, the use of a single DL model allows the development of a network structure with multiple outputs to model them all coherently. Besides, the recomposition of the full spatiotemporal field can be executed through an additional layer embedded in the network, allowing to train the entire model to minimize a loss computed directly on the output signal. Such a network can be used to solve for missing data imputation problems in spatiotemporal datasets, wherein the output is context rich information that is spatially and temporally aligned.

Figure 15:
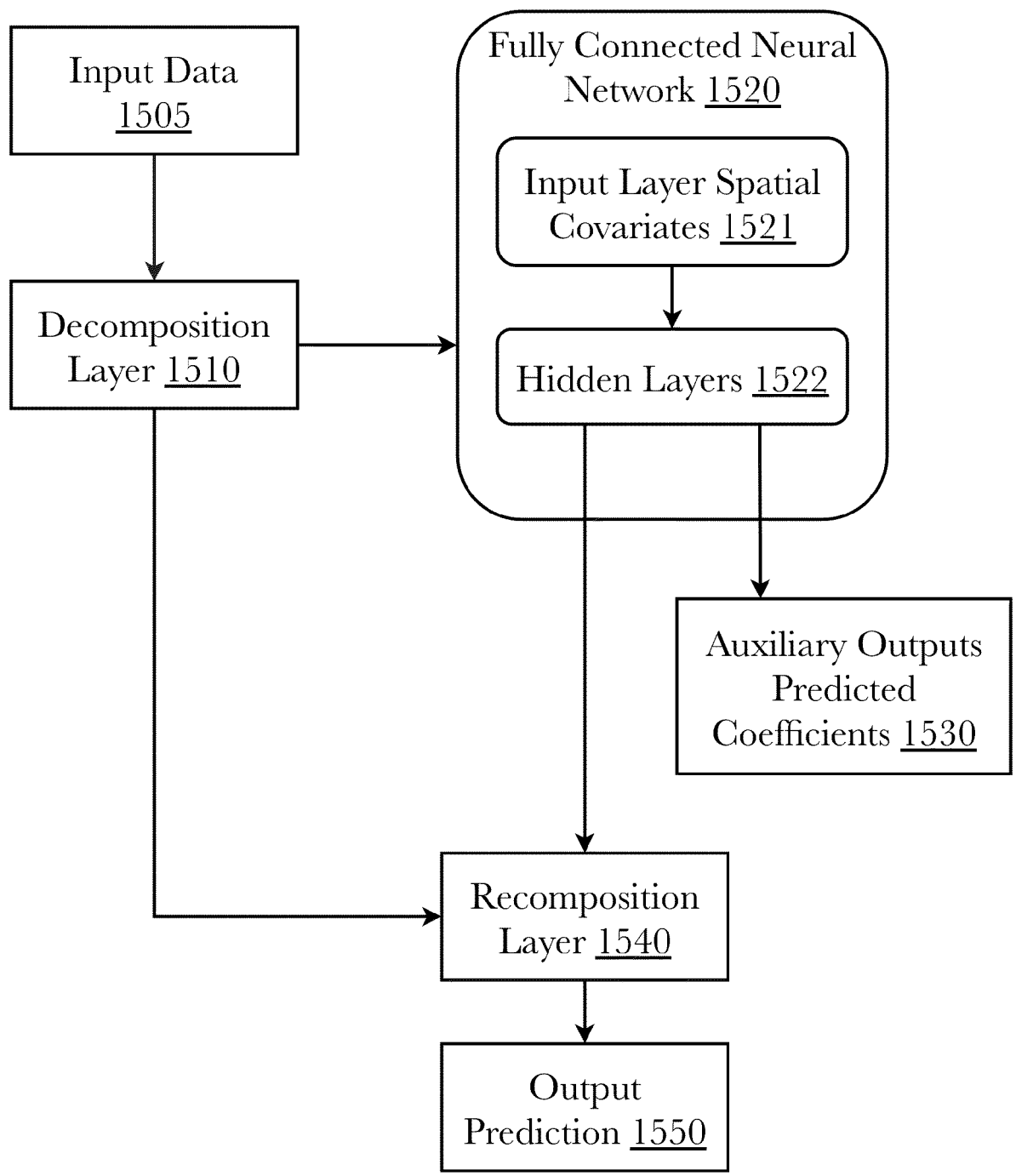
FIG. 15 is a block diagram illustrating an exemplary architecture for a deep learning network configured as for spatiotemporal analysis.

In some implementations, the above described deep learning network is a deep feed-forward fully connected neural network. An exemplary architecture of the network is described in FIG. 15. Referring now to FIG. 15, the diagram illustrates an exemplary architecture for a deep learning network configured as a spatiotemporal AI. The input data 1505 may comprise spatiotemporal data signals such as, but not limited to, data sources 950*a-n*, TAZ data, load profile data, air quality data, state of charge data, energy wholesale market data, traffic flow data, EV penetration data, probabilistic data, simulated data, etc. The temporal bases of the spatiotemporal input data are extracted from a decomposition of the spatiotemporal input data at the decomposition layer 1510. In some aspects, the decomposition layer may utilize empirical orthogonal functions (EOFs) to perform the decomposition of the input signal. Then, a fully connected neural network 1520 is used to learn the corresponding spatial coefficients. The stochastic spatial coefficients corresponding to each basis function are modeled jointly at any desired spatial location with a DL regression technique. Spatial covariates are used as inputs 1521 for the neural network 1520 having a first auxiliary output layer 1530 where the spatial coefficients are modeled. Additionally, neural network 1520 has many hidden layers 1522 wherein the complex relationships between temporal and spatial data is learned. A recomposition layer 1540 will then use the modeled coefficients and the temporal bases resulting from the EOFs decomposition in order to reconstruct the final output 1550 i.e., the spatiotemporal field. The described network has multiple inputs, namely the spatial covariates, which flow through the full stack of layers and the temporal bases directly connected to the output layer. It has multiple outputs, namely the spatial coefficients for each basis, all modeled jointly, and the output signal. As designed, the DL network can exploit spatial and temporal relationships across disparate datasets to create large amounts of information-rich contextual data. This contextual data can be used to create load profiles and may also be used as an input into one or more neural networks 1342*a-n* configured to predict an optimal price signal.

It should be appreciated that fully connected neural network 1520 may be constructed using various types of deep learning algorithms known to those with skill in the art. For example, neural network 1520 may comprise a convolutional neural network, a recurrent neural network, a long short-term memory neural networks, Bayesian methods together with recurrent neural networks, and the like. A common approach may be to take into account the correlation among different measurement locations is to consider them as node in a graph, which can then be modeled using specific DL architectures. The main limitation to such methodology is that prediction is only possible at the spatial locations of the measurement stations and not at any spatial location of potential interest.

Referring back to FIG. 13, machine learning module 1340 is present and configured to construct and maintain one or more machine and/or deep learning models. One such model that may be constructed and maintained is an energy storage value stacking estimation (ESVSE) model 1341. The ESVSE model 1341 employs the use of a state of charge function and a revenue function, which when optimized together can be used to estimate the maximum revenue a DER (e.g., DCFC charging station, level 2 charging system, BESS, etc.) can produce when operating constantly each hour of each day of the year. In some embodiments, a linear optimization model is developed with the objective of maximizing the potential revenue from the utilization of the energy storage device (e.g., DER) in every hour over the course of the year. In these embodiments, the following state of charge function may be used:

$$S_T = \gamma_s S_{t-1} + \gamma_c q_t^{Cha} - q_t^{DisEV} - q_t^{DisAb} + \gamma_c \alpha_{rd} \mu_{rd} q_t^{RD} - \alpha_{ru} \mu_{ru} q_t^{RU}$$

$$\gamma_{ru} = \alpha_{ru} \mu_{ru}$$

$$\gamma_{rd} = \alpha_{rd} \mu_{rd}$$

$$\alpha_{ru} + \alpha_{rd} = 1$$

$$0 \leq \mu_{ru}, \mu_{rd} \leq 1$$

The inventors find these percentage regulations using empirical data following the equations given below:

$$\alpha_{ru/rd} = \frac{\# \text{ of ramp up and ramp down AGC samples in period}}{\# \text{ of AGC samples in period}}$$

$$\mu_{ru/rd} = \frac{\sum \# \text{ of ramp up and ramp down AGC samples in a period}}{\# \text{ of ramp up and ramp down samples in a period}} \cdot \frac{\text{one period}}{q_t^{ru/rd}}$$

Their representation in vectorized forms is given below assuming $S_{t=0} = 0$. Let $$A_s = \begin{bmatrix} A_{dis}^{EV} & A_{dis}^{Ab} & A_{cha} & A_{RU} & A_{RD} \end{bmatrix}$$

having time T time periods, a new vector is defined $$x = \begin{bmatrix} q_1^{DisEV} \cdots q_T^{DisEV} & q_1^{DisAb} \cdots q_T^{DisAb} & q_1^{cha} \cdots q_T^{cha} & q_1^{RU} \cdots q_T^{RU} \\ q_1^{RD} \cdots q_T^{RD} \end{bmatrix}^T \in R^{5T \cdot 1}$$

subject to $$0 \leq q_t^{DEV} + q_t^{DAb} + q_t^{RU} \leq \underline{q}^D$$

$$0 \leq q_t^{RD} + q_t^R \leq \underline{q}^R$$

$$0 \leq S_t \leq \underline{S}$$

which can be expressed linearly with $$Ax \leq b$$

where $$A = \begin{bmatrix} -A_d^{EV} & -A_d^{Ab} & -A_r & -A_{ru} & -A_{rd} & A_d^{EV} & A_d^{Ab} & A_r & A_{ru} & A_{rd} & -I & -I & 0 & I \\ 0 & 0 & 0 & -I & 0 & -I & 0 & 0 & I & 0 & I \end{bmatrix}$$

and $$b = \begin{bmatrix} 0 & \underline{S} & 0 & \underline{q}^D & 0 & \underline{q}^D \end{bmatrix}^T$$

So x can be bound with $lb \leq x \leq ub$ where $lb, ub \in R^{5T \cdot 1}$ and $$lb = 0^{5T}$$

and $$ub = \begin{bmatrix} \underline{q}^D \cdots \underline{q}^D \cdots \underline{q}^R \cdots \underline{q}^D \cdots \underline{q}^D \end{bmatrix}^T$$

where every element displayed in the vector representation above is followed by four equivalent elements symbolized by the '...'.

The variables presented above have the following definitions:

$a_{rd}$ is % regulation down reserved capacity that's stored
$a_{ru}$ is %regulation up reserved capacity that's deployed
$\gamma_s, \gamma_c$ is storage efficiency and charging efficiency of the battery
$\mu_{rd}$ is average fraction of regulation down called upon
$\mu_{ru}$ is average fraction of regulation up called upon
$C_d, C_r$ are the costs of discharge and recharge, respectively
$P_t$ is least marginal price (LMP) under the assumption of real-time compensation
$P_t^{ru}, P_t^{rd}$ is the prices of regulation up and regulation down, respectively
$q_t^{Cha}$ is the energy recharged at time period t
$q_t^{DisAb}$ is the energy discharged for arbitrage
$q_t^{DisEV}$ is energy discharge for electric vehicle charging
$q_t^{RD}$ is the quantity of energy bought from the regulation down market at time t
$q_t^{RU}$ is the quantity of energy bought from the regulation up market at time t
$S_t$ is the state of charge of the battery denoting the energy stored in the battery at discrete time t The revenue R that the system aims to maximize is as follows:

R = Discounting *[Profit from EV charging + Profit from Regulation Up market + Profit from Regulation Down market + Cost of buying energy to charge]

$$R = \sum_{t=1}^{T} \left[ P_t^{EV} q_t^{DEV} + (P_t - C_d) q_t^D + P_t^{ru} q_t^{ru} + (P_t - C_d) \alpha_{ru} \mu_{ru} q_t^{ru} + P_t^{rd} q_t^{rd} - (P_t + C_r) \alpha_{rd} \mu_{rd} q_t^{rd} - (P_t + C_r) Q_t^R \right] e^{rt}$$

$$R = f^t x$$

$$J^* = -f^T x$$

And to best tailor the maximization of revenue to traditional optimization approaches, the variable J is defined and what is minimized.

Informed by observed price signals from the data analysis capabilities of the disclosed system, the various revenue streams for the energy storage systems (e.g., DER, XF DCFC systems, level 2 charging systems, etc.) through value stacking and uncertainties in the hourly EV demand profile and future demand forecast, particularly for DCFC, the inventors define the following exemplary scenarios under which to run the model and compare the results to inform optimal decision making: 1) the base scenario, as modeled above, considers energy arbitrage and frequency regulation as ancillary services provided in addition to EV charging, using the EV demand profile adapted from the recorded observations, such as is depicted in FIG. 14; 2) Seasonal variation scenario, wherein the input data is split into four seasons and explores the impact of seasonal variation on results; 3) High EV demand scenario, wherein forecasted future EV DCFC hourly load/demand profiles from SLAC-GISMO and explore the impact on revenue; and 4) Resource Adequacy scenario, where the impact of participation in the capacity market on revenue is explored, modifying the above model to include the contract quantity of power in each model as a decision variable.

The input to the above described state of charge and revenue models may be obtained from a plurality of sources. Examples of such data sources can include hourly day-ahead market (DAM) location marginal price (LMP) data from one or more nodes in energy distribution network, data on unit compensation prices for energy storage services, including ancillary utility services, time series data gathered from deployed charging stations, sensors, and utility partners, risk scores, state of charge, configuration parameters, and energy contract details (e.g., price agreements, penalties, length of contract, etc.). This data and more may be used to inform the variables described above which the model can use to optimize revenue for one or more DER in a distributed energy network by determining the best price signal to send to the one or more DER dependent upon the location and time in which the price signals are generated.

Historical day-ahead market locational marginal price data can be used to gather an initial dataset of battery scheduling and profits across a given time period and/or geographic region. An example of how DAM LMP data is used by the system is provided. For observing the battery scheduling and profits over the course of a year, the year 2020 and the Mountain View, California MTVIEW_1 N0001 price node as the substation of reference. This data can be obtained from Oasis-CAISO (California Independent System Operator region). Such data may be ingested by data ingestion module 1001 and during pre-processing the system analyzes and visualizes time-series data, understating hourly, daily, monthly, and seasonal variation in electricity pricing. Furthermore, sample statistics are extracted (e.g., mean and standard deviation) for LMP in each hour over the entire year, as well as for daily prices in each month. Understanding the pattern of variation in the price signals over the course of a day and year is key in informing model choices as well as identifying interesting scenarios (such as those mentioned above) worth analyzing for revenue maximization.

The energy storage system may be any suitable DER capable of storing energy. In some implementations, the energy storage system is a 350 kWh Li-ion battery with an AC-DC inverter rated at 40 kW, 208/240 V AC, and peak current of 200 Amps. The AC-DC inverter is rated at >= 92% efficiency, the DC-DC converter at >= 96% efficiency, and an overall energy storage roundtrip efficiency of about 95%. Such a system is similar to the components of at least 100, 200, and 300. In other implementations, the energy storage system may be a level 2 or level 3 standalone EV charging system. In other implementations, the energy storage system may comprise some combination of level 2 and DCFC systems.

The computed state of charge for the energy storage systems, the computed maximum revenue for a DER, the load profiles for each region (e.g., TAZ, micro-grid, etc.), the context-rich spatiotemporally aligned data, the TAZ data, regional risk scores and configuration parameters, and data sources 950*a-n* may be used as inputs into one or more neural networks 1342*a-n* which are configured to output optimal price signals for an individual DER, a region, a micro-grid, etc., which can be used to set the prices for EV charging services, energy arbitrage actions, and grid regulation actions (e.g., frequency/voltage regulation, etc.).

Figure 16:
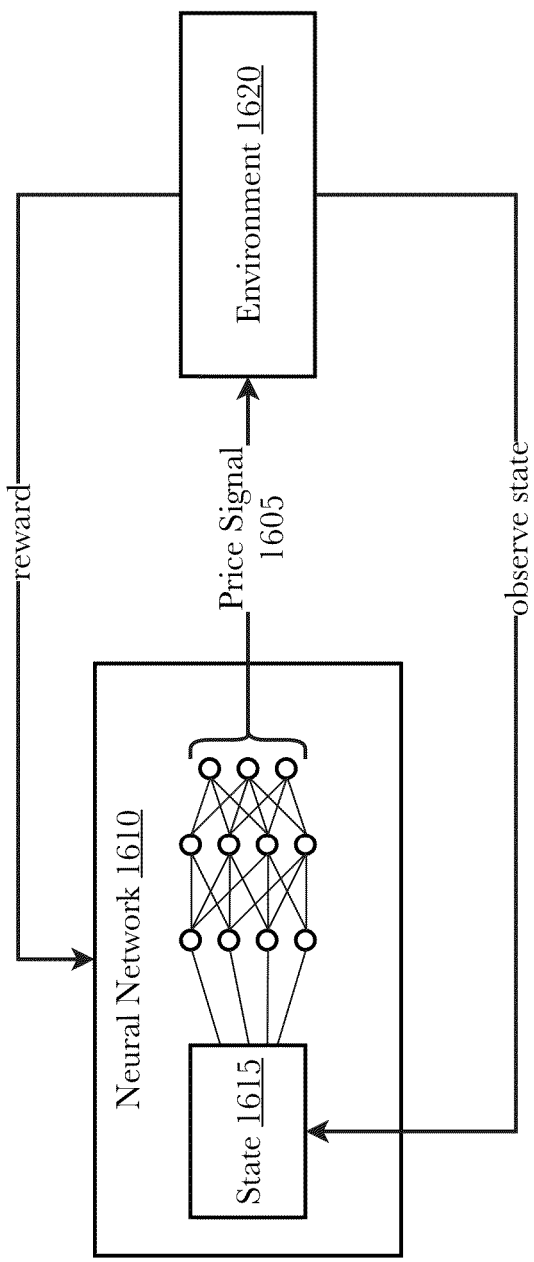
FIG. 16 is a block diagram illustrating an exemplary architecture for a deep reinforcement learning neural network.

The one or more neural networks 1342*a-n* may take in as inputs the state of the grid and the state of the demand on the system (e.g., as determined by the risk scores and configuration parameters) and historical data to estimate spatiotemporal prices that determine a best reward strategy. In some embodiments, the one or more neural networks are configured using augmented reinforcement learning techniques which allow a machine learning algorithm to learn to find an optimal solution by being rewarded when its predictions are correct, or lead to a desired outcome. In some embodiments, the AI system is a deep reinforcement learning neural network. FIG. 16 is a block diagram illustrating an exemplary architecture for a deep reinforcement learning neural network, according to an embodiment.

Referring to FIG. 16 an exemplary deep reinforcement learning neural network architecture is shown comprising a neural network 1610 which receives current system state information 1615 obtained from data sources and sensors in an environment 1620, and feeds the state information through a fully connected neural network in order to predict, as output, an optimal price signal 1605 which can be used to drive energy storage management decisions and maximize profit. The predicted price signal may be deployed to an environment 1620 (e.g., a DCFC charging station, a grid, micro-grid, local network, etc.). The received price signal may cause some environmental components to change their operating state. In this case, the same data sources and sensors may be used to observe the change in state and send this new state to the neural network 1610 in order to continuously and autonomously learn and predict based on the new, real-time information. Additionally, a reward is determined and applied to neural network 1610 which utilizes the reward to adjust network parameters and hyperparameters based on the reward. For example, if neural network predicts a price signal that leads to an increase in profit, then the reward may be a positive reinforcement that informs the neural network that it is tuned properly. Over time, this reward structure allows the one or more neural networks 1342a-n to learn and refine its predictive capabilities over time as input datasets grow and more data is obtained.

Referring to FIG. 13 the predicted price signals from the one or more neural networks 1342a-n may be sent to a distribution module 1350 which is configured to determine the optimal distribution of price signals to one or more DER controllers. In some embodiments, distribution module 1350 may be part of a local controller such as controller 715 which can receive pricing signals from optimization core 1200 and configure connected components as necessary. In other embodiments, predicted price signals may be sent to a global controller which manages each and all nodes in a distributed network, and may distribute the price signals to appropriate nodes for nodal configuration.

In operation, pricing module may receive a plurality of data of various data types including, but not limited to, DAM LMP data, unit compensation prices for energy storage services, including, but not limited to, ancillary and utility services, risk score and configuration parameters, state of charge data, maximum revenue data, time series data, spatiotemporal signals, and data sources 950a-n. This plurality of data may be used by pricing engine 1300 in order to spatially align disparate datasets by converting electrical line data into spatial polygon data, or a TAZ. For each location or TAZ, pricing engine 1300 may then determine a load profile associated with a TAZ or a DER in the TAZ. The spatially aligned data and the load profile may be sent to spatiotemporal module 1330 wherein the relationships between spatial and temporal data is learned via deep learning, resulting in information rich contextual data that can be used for load profile construction and used as input data into machine learning module 1340. At machine learning module 1340 a value stacking model is used to determine a state of charge and maximum revenue associated with a TAZ, DER, etc. using real-time and historical data. The computed state of charge and maximum revenue are sent one or more neural networks 1342a-n, which uses that information, the input data 1301, the TAZ data, the load profile data, risk scores, and real-time and historical data to predict optimal price signals. These updated price signals may then be distributed to each energy store in the grid in order to adjust pricing associated with different actions such as, for example, EV charging, energy arbitrage, regulation market functions, and wholesale energy market transactions.

Detailed Description of Exemplary Aspects

Figure 5:
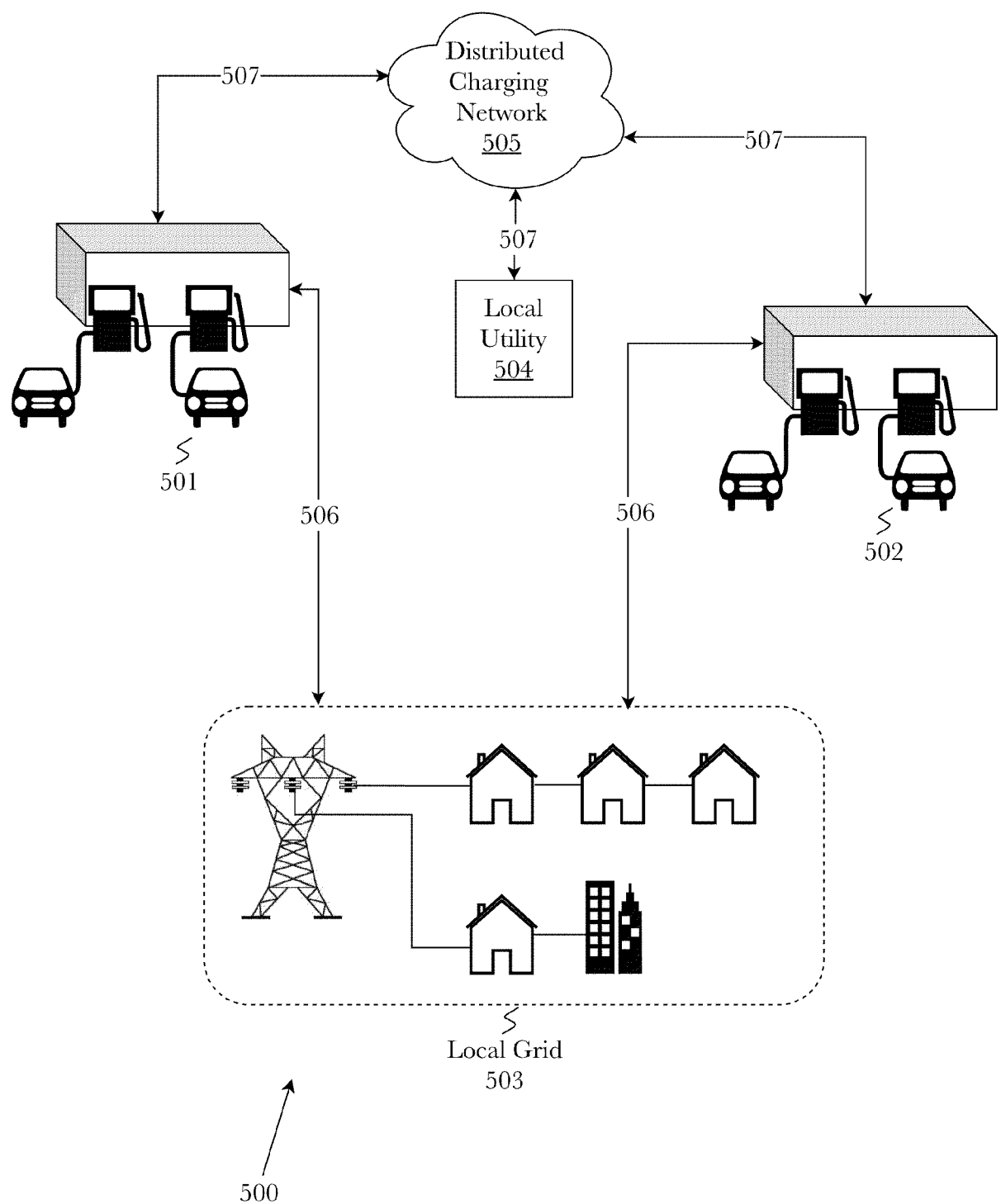
FIG. 5 is a diagram illustrating an exemplary scenario where multiple EV XFC stations are used to provide power resources to a single local grid, according to an embodiment of the system.

FIG. 5 is a diagram illustrating an exemplary scenario 500 where multiple EV fast charging stations 501, 502 are used to provide power resources to a single local grid 503, according to an embodiment of the system. The deployment of multiple EV fast charging stations and their connections 507 to the distributed charging network 505 represents a virtual grid resource that can be used by local utility 504 companies, who are also connected 507 to the distributed charging network, to manage resource adequacy by performing grid balancing operations. The diagram illustrates a scenario 500 where a local utility 504 is struggling to satisfy grid demand for a particular local grid 503. The local utility 504 is transmitting grid demand and consumption data to the distributed charging network 505 which can then be accessed by the EV fast charging stations 501, 502 to determine the optimal power split levels of the charging station battery storage device. In this case, the two EV fast charging stations are able to view the grid demand data and employ machine learning algorithms to decide the optimal power split levels for each charging station. For example, station 501 may be in an area that has high EV traffic and as such it needs to reserve a greater amount of reserve power for EV fast charge operations, whereas station 502 may be able to reserve more power for grid operations. The two stations 501 and 502 communicate with each other to optimize the energy reserves of both stations so that both local grid demand and EV fast charge demand can be met. When the optimal power split is determined, the stations may begin to provide grid balancing operations by supplying 506 power for the local grid 503.

Figure 6:
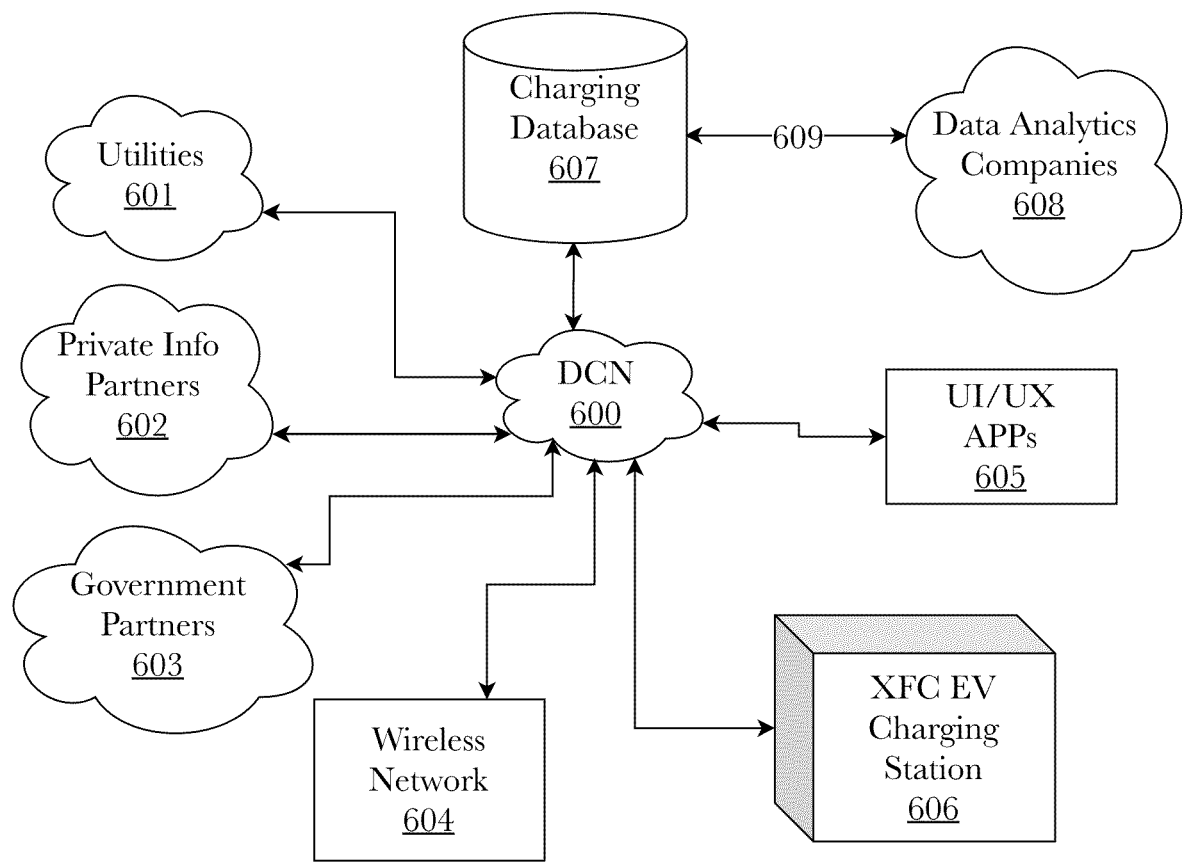
FIG. 6 is a flow diagram illustrating the information flow between various data sources and the distributed charging network.

FIG. 6 is a diagram illustrating the information flow between various data sources and the distributed charging network (DCN) 600. Example data sources include, but are not limited to utility companies 601; private information partners 602; government partners 603; wireless networks 604 such as 4G or 5G networks; multi-platform user interface 605 such as cell phone or computer apps; and the charging stations 606. The DCN 600 is accessed via an API and all exchanged data is persisted in a charging database 607. Utility companies 601 and the DCN 600 exchange data relating to grid status and capacity information such as grid demand, grid frequency, grid voltage, data feedback, power rates, grid balancing support, and power supplied to the station 606. Private information partners 602 may provide data such as traffic reports, EV location, user sentiment about charging station services, etc. Government partners 603 may exchange data about emergency alerts or regulations that affect charging station 606 operations. Types of data exchanged between the UI 605 and the DCN 600 may include on-the-go payments, station location, registration information, charge station subscription information, and contact information. The charging station 606 exchanges data pertaining to control, usage, alerts, battery status and lifespan, payments, and grid status. While wired network connectivity may be used, the DCN 600 can optionally facilitate the data exchange using wireless networks 604 and the charging station 606 may provide system redundancies in case of power blackout. If there is a power blackout, the wireless network 604 towers will also lose power, which often means current EV charging stations lose the ability to communicate with the grid and subsequently cannot provide a charge (as is the case in the prior art). The charging station 606 is able to power itself and perform charging services in the event of a grid blackout, as well as storing data such as payment transactions for later transmission and reconciliation, which means that EV drivers can charge their vehicles despite a lack of network 604 connectivity (whether wired or wireless). Additionally, the charging station 606 may be able to supply power to a local grid that includes a wireless network 604 tower, such that in the case of a power blackout the wireless network connection can be maintained and charging station operations may continue uninterrupted.

The charging database 607 provides long term storage of the data sent and received from the various data sources. This data contained within the database (e.g., power consumption, power rates, consumer profiles, appliances) can be sold 609 to utilities, car manufacturers, data analytics companies 608, etc., to provide an additional source of revenue to the charging station 606 operator.

Figure 7:
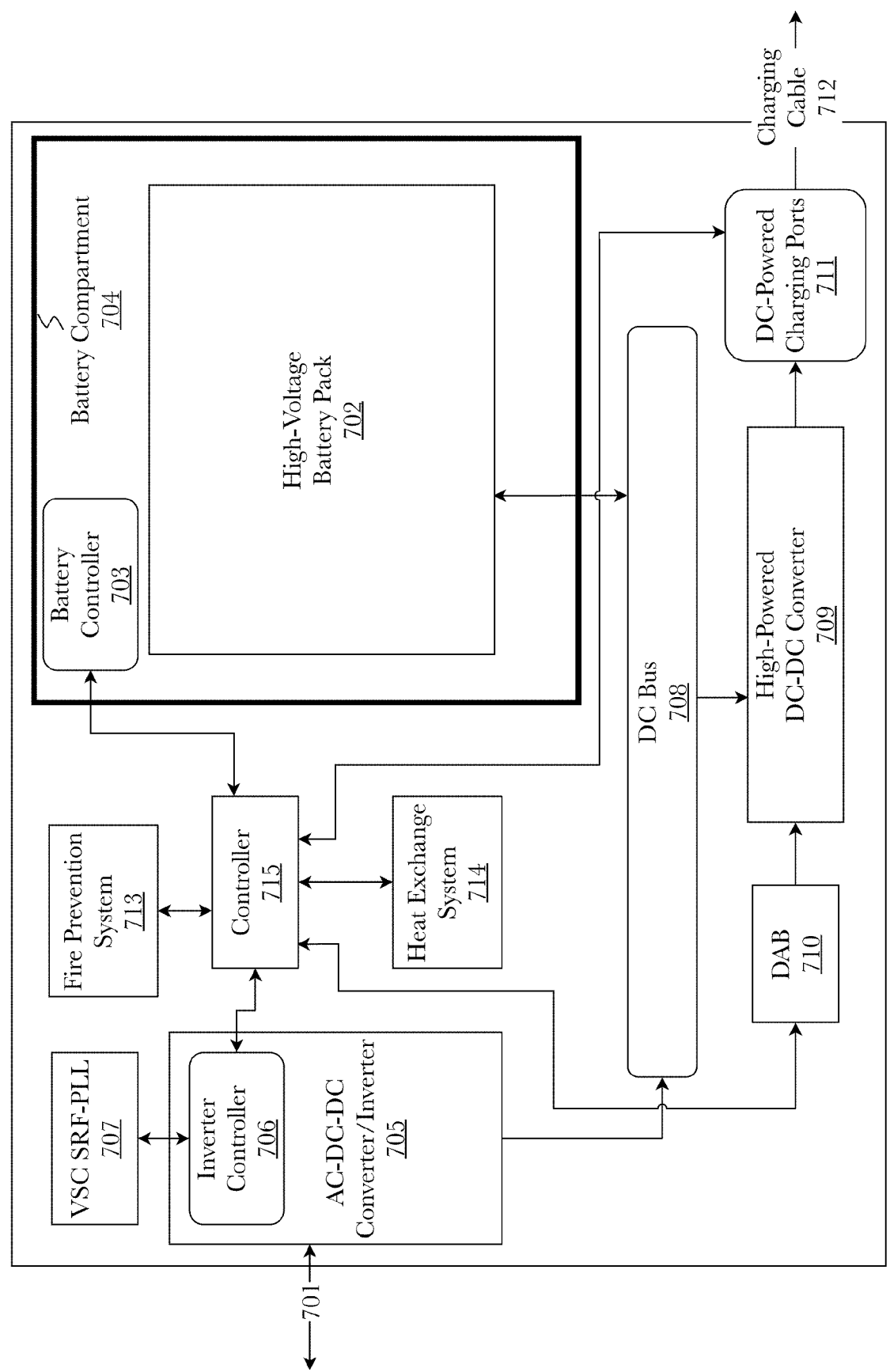
FIG. 7 is a diagram of an exemplary self-contained charging station system that provides both an electric vehicle fast charging service and a grid resource management service.

FIG. 7 is a diagram of an exemplary self-contained charging station system 700 that provides both an electric vehicle fast charging service and a grid resource management service. In a preferred embodiment, the system may be comprised of a high-voltage battery pack 702; an AC-DC-DC converter-inverter 705; a high-powered DC-DC converter 709; DC-powered charging ports and cables 711; a master controller 715; various safety systems (e.g., 713) like cooling systems; and various other power electronic components. In an embodiment, the system integrates the above-mentioned charging components and forms a single-box, self-contained charging station 700 requiring only a grid tie 701, typically a single-phase, 208/240 V RMS connection.

In an embodiment, the high-voltage battery pack 702 is designed to have a nominal voltage of 800 V in order to reach the final bus voltage (the voltage at the output of the high-powered DC-DC converter 709) of 950 V to provide adequate power to the DC-powered charging ports 711. The high-voltage battery pack 702 is constructed using an array of battery cells connected in series forming a module, where the combination of multiple modules is used to provide the nominal battery pack voltage of 800 V. The cells are cooled through extruded metal sections that take the heat away from the cells through a conductive gel. The heat from the metal extrusions is then taken away through liquid coolants supplied to the pack through one input/output port per battery array module. Each module has a battery controller 703 that monitors the temperature, voltage, and current of the module and feeds the data to the system controller 715. As an example, the array modules could be made from existing battery sources, for example Tesla Model S™ EVs or Samsung SDIs. Additionally, the high-voltage battery pack 702 is designed to be able to store 350 kWh of energy as well as to sustain up to 2C discharge rates continuously to enable fast charging of electric vehicles. Charge and discharge rates of a battery are governed by C-rates. The capacity of a battery is commonly rated at 1C, which means that a fully charged battery should provide a certain amperage for one hour (e.g., a battery rated at 1 amp-hour (Ah) should provide 1 A of current for one hour). The same battery discharging at 2C would provide twice the amperage for half the time. The high-voltage battery pack 702 may be used to store energy when power rates are low, providing a low-cost energy reserve resource that can be used in a variety of ways. One use for the energy reserves may be to improve throughput to the charging station. For example, the charging station may provide charging services to two electric vehicles using battery reserves and then accommodate a third vehicle using energy directly taken from the grid, increasing the throughput of the station. Another potential use of the battery pack energy reserves could be to provide grid services such as frequency regulation and demand response. To protect against fire or explosion, the high-voltage battery pack 702 is housed within an enclosed battery compartment 704 made of steel 2 mm thick with the dimensions of 6-7.5 feet long, 5.1 feet wide, and 6-8 feet tall, with vents that open up with blast pressure. This will protect against damage from any impacts to the battery storage system, while stopping any hazards from escaping the station in case of a fire. Including the weight of the battery pack and the battery compartment, the overall weight of the battery system is about 5000-8000 lbs.

In an embodiment, the AC-DC-DC converter-inverter 705 is directly tied 701 to a three-phase 400 V RMS grid connection, or a single-phase 208-240 V connection and forms the input state to the charging station system 700. The AC-DC-DC converter-inverter 705 is a bi-directional circuit that allows power to flow from the grid into the charging station to power the charging ports 711 and to charge the high-voltage battery pack 702. In order for the charging station to power the 350 kW chargers, the power exchange between grid and charging station is limited to 100 kVA. The AC-DC-DC converter-inverter 705 consists of two converters. An AC-DC converter circuit featuring a T-type inverter which is a variation of the commonly used and known full-bridge inverter in which one of the four switching legs of a full-bridge is replaced with a T-type switching leg. The T-type inverter is more efficient than a full-bridge inverter because the addition of the T-type leg decreases switching voltages and frequencies. This has the effect of greatly reducing switching losses and inductor core losses, improving overall system efficiency. The second converter is a DC-DC converter system that provides electrical isolation and voltage balancing of the battery system. The DC-DC converter provides isolation between the AC side of the system and the DC side of the system by preventing AC harmonics in current and voltages from interfering with the DC componentry within the charging station. Additionally, the AC-DC-DC converter-inverter 705 is connected to an inverter controller 706 that communicates indirectly with the battery controller 703 via the system controller 715 to manage battery voltage and current parameters. The inverter controller 706 may consist of any suitable microcontroller device, for example a programmable logic controller (PLC). The system controller 715 is able to optimize the connection with the grid by sending control signals to the inverter controller 706 which regulates grid interfacing voltage using a voltage source converter (VSC) in a conventional synchronous reference frame phase-locked loop (SRF-PLL) 707 for synchronization with the three-phase grid. The VSC SRF-PLL 707 use a feedback loop to match the frequency and phase of the three-phase grid using control signals (e.g., pulse width modulation) from the inverter controller 706 to set the frequency and phase angle after each loop until the grid frequency and phase is matched. After the frequency and phase have been matched to the grid, the inverter controller 706 sends a signal to inform the system controller 715 that the station has an optimal connection to the grid.

In an embodiment, the output of the AC-DC-DC converter-inverter 705 is connected to an 800 V DC bus 708 that connects to the high-voltage battery pack 702 to provide power for charging the battery. The 800 V DC bus 708 also connects to a high-powered DC-DC converter 709 that boosts the 800 V DC bus to a final bus voltage of 950 V to power the DC-powered charging ports 711 and enable electric vehicle fast charging. The topology of the DC-DC converter 709 is built to be unidirectional and non-isolated as isolation is already achieved at the input stage. A dual active bridge (DAB) converter 710 may be used to control the voltage of the high-power DC-DC converter 709 to regulate the final bus voltage. The control parameters for the DAB 710 are the duty ratio and the bridge voltages, which can be set using a control signal from the system controller 715. In an embodiment, the DC-DC converter 709 is a half-bridge converter as opposed to buck-boost converters, as the half-bridge converter is known to achieve higher efficiencies than buck-boost converters. The DC-powered charging ports 711 are designed to operate as a unidirectional, non-isolated system (as isolation is already achieved in the input stage). The overall efficiency of the DC-DC converter 709 is expected to be upwards of 90%. In addition to providing DC fast electric vehicle charging, the DC-powered charging ports 711 are capable of providing EV charging at levels 1 and 2 by limiting the total power output to up to 15 kW but through DC charging ports, and the voltage ripple of the DC-DC converter 709 limited to 5%. With a final bus voltage of 950 V, the charging station 700 can charge vehicle architectures up to 8500 V. Connected to the charging ports 711 are charging cables 712 that are designed to withstand 500 A of continuous current at a voltage output of 950 V. This corresponds to a max output of power at 350 kW, with an output voltage range of 250—950 VDC 50. The charging cables are no less than 15 feet in length and must be liquid cooled to support the 500 A continuous current. In an embodiment, the fluid used to cool the charging cables should be dielectric and non-flammable such as Novec™ fluids. Examples of other cooling fluids that may be used are mineral oils and water glycol. The DC-powered charging ports 711 communicate with the automotive body control module (BCM) through the combined charging system (CCS) standard to exchange data such as real-time EV battery charge capacity.

According to an embodiment, the fire prevention system 713 utilizes an aerosol application that stops potential fires through a chemical process that halts the chain reaction, providing an eco-friendly fire prevention system with built-in redundancies to limit false activation of fire prevention measures. The fire prevention system 713 is connected with the system controller 715 to exchange data about the status of the fire prevention system 713.

The charging station system 700 also utilizes a heat exchange system 714 to regulate the heat generated from the electronic components due to the high voltage and current levels required by the station. In an embodiment, the heat exchange system 714 may consist of one or more air to air heat exchangers. Air to air heat exchangers represent a closed loop cooling system which uses heat pipe technology to exchange heat from the enclosure of the charging station to the outside. These types of heat exchange systems are very efficient at cooling because the waste heat is actually used to drive the system, and the only power requirement is to operate two circulating fans or blowers.

The operation of the charging station system 700 is managed by a system controller 715 that communicates with both the internal subsystems of the station and an external cloud-based network to monitor and optimize station performance. According to an embodiment, the controller 715 is responsible for controlling the output of the battery pack, optimizing EV charging services, optimizing the connection with the grid, talking with EV computer for calculating charge levels, sending charge station status data to the cloud-based network, receiving data from the cloud-based network, and using machine learning algorithms to manage grid services such as frequency regulation and demand response. All data exchange between the system controller 715 and the subsystem controllers is through a unified bus system, on SAE-J1772 protocol.

Figure 8:
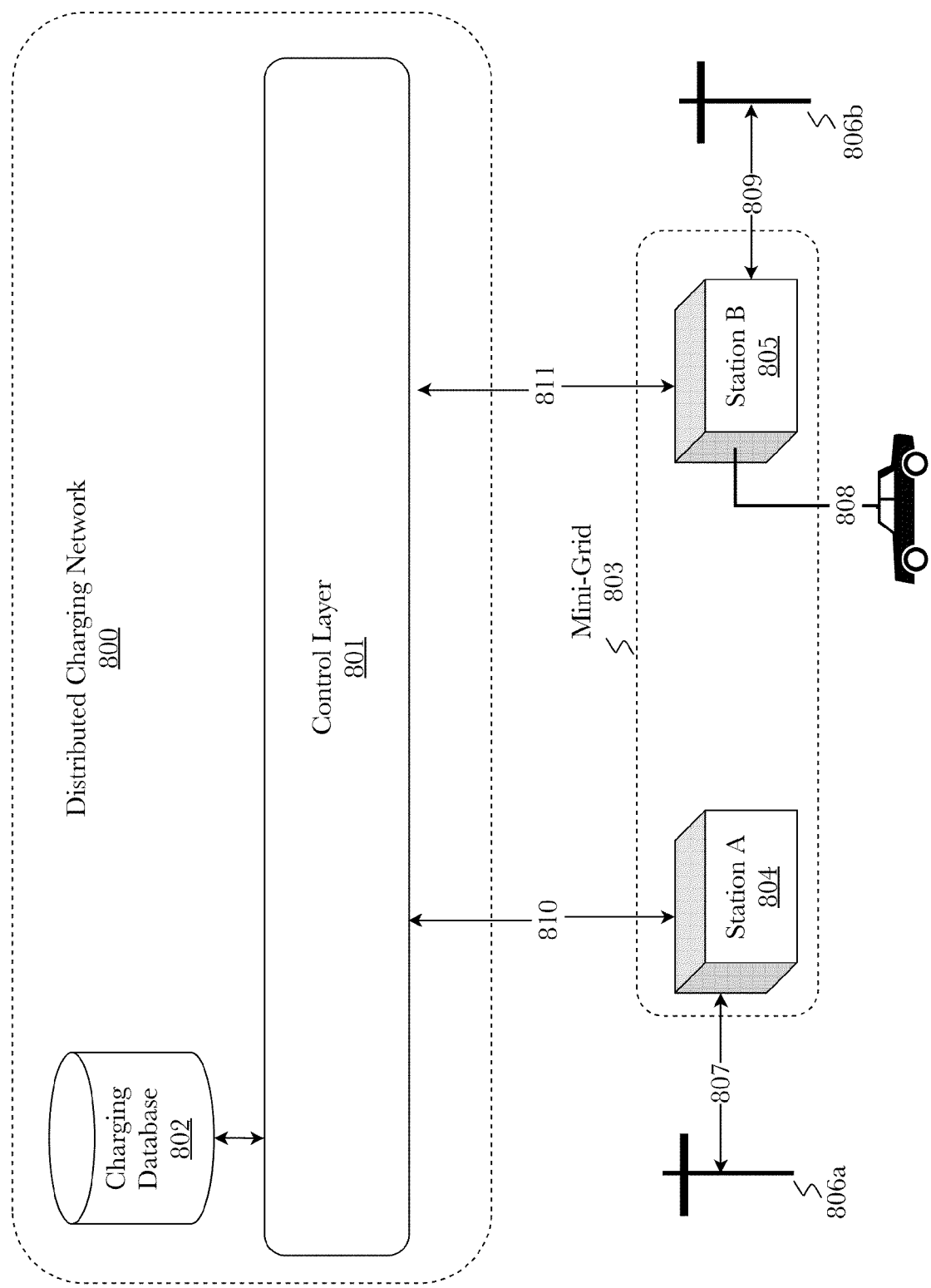
FIG. 8 is a diagram of a control layer, operating within a distributed charging network, performing control and optimization tasks to support "mini-grid" services and operations as carried out by the charging station system.

FIG. 8 is a diagram of a control layer 801, operating within a distributed charging network 800, performing control and optimization tasks to support "mini-grid" 803 services and operations as carried out by the charging station system. Each station individually, or in cooperation with other stations, acts as its own mini-grid 803 using a control layer 801 that tracks how much power charging station A 804 supplies to the grid 806*a* and how much power charging station B 805 takes out 809 of the grid 806*b*, such that it can virtually "shift" power among and between system controllers in the mini-grid 803. Both the control layer 801 and each charging station 804, 805 represent redundancy layers in case of power outages or supply problems in the power grid 806*a-b*. Machine learning algorithms may be used to determine when the mini-grid 803 should supply power to the main grid or should retain its power to support EV charging. The control layer 801 may access the charging database 802 which stores and manages all data received from various data sources including, but not limited to utilities, UI/apps, charge stations, government partners, and wireless networks. The control layer 801 employs machine learning algorithms that use the charging database 802 data to decide mini-grid 803 management and optimization tasks.

For example, the control layer 801, utilizing the charging database 802, retrieves and processes grid demand data, charge station battery and usage data, and charge station location data to determine how stations A 804 and B 805 should prioritize battery reserve capacity. In the event of a blackout or brownout, the control layer 801 using predictive algorithms may determine and instruct 810 that station A 804 should supply 807 power to the grid to balance out short fluctuations, but because station B 805 is in a location where EV charging service is heavily used, the control layer 801 will instruct 811 station B 805 to retain power as an emergency "get me home" resource for charging 808 EVs during a power blackout or brownout event.

Figure 17:
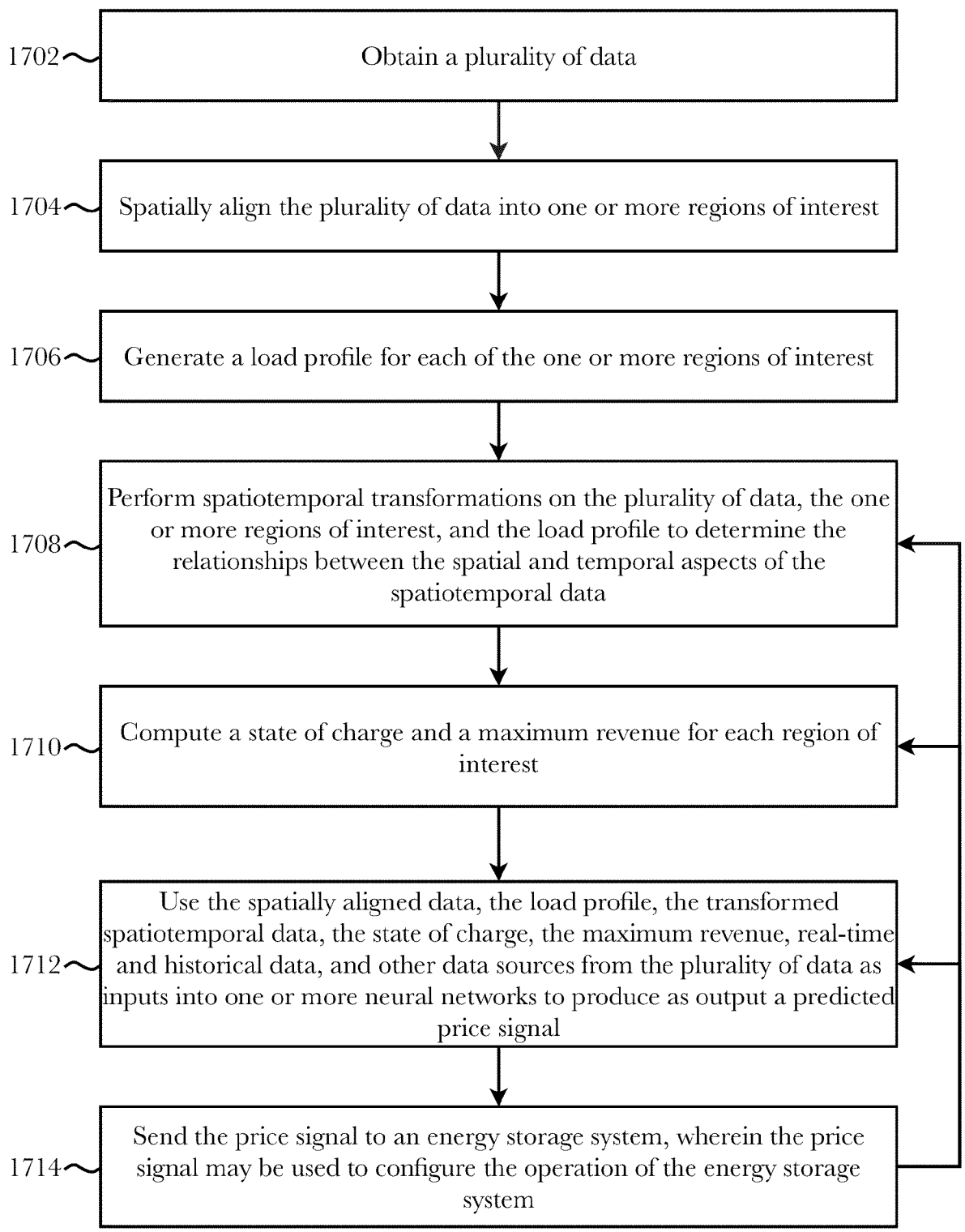
FIG. 17 is a flow diagram illustrating an exemplary method for providing real-time micro-grid optimizations via price signals.

FIG. 17 is a flow diagram illustrating an exemplary method for providing real-time micro-grid optimizations via price signals. According to an embodiment, the process begins at step 1702 when a plurality of data is obtained and ingested by optimization core 1200. An area clustering module may then process the plurality of data in order to spatially align the data into one or more regions of interest 1704. These regions may correspond with the regions used by optimization core when computing risk scores using neural networks 1002*a-n*. In some implementations, the regions of interest may be in the form of a TAZ. At step 1706, a load profiler 1320 may generate a load profile for each of the one or more regions of interest. The load profile may be generated using available data from both public and private databases. Additionally, a load profile may be generated using available data supplemented with the output data from spatiotemporal transformation module 1330. After the load profile has been generated, the spatiotemporal transformation module 1330 may perform the next step 1708 by applying transformations on the plurality of data, the one or more regions of interest, and the load profile to determine the relationships between the spatial and temporal aspects of the received spatiotemporal data. A neural network, such as the one described in FIG. 15, may be used to perform the transformation process and to learn the complex relationships between spatial and temporal components of disparate datasets. The output of spatiotemporal transformation module 1330 is a data set of information-rich context data that can be used to infer or derive spatiotemporal dependencies between and among regions of interest and/or energy storage systems. This context-rich information may be used as an input into a ESVSE model 1341 which computes the state of charge corresponding to an energy storage system (ESS) and/or region of interest as well as the expected maximum revenue which can be generated by operating the ESS continuously each hour of each day at step 1710. At the next step 1712, the spatially aligned data, the load profile, the transformed spatiotemporal data, the state of charge, the maximum revenue, real-time and historical data, and other data sources from the plurality of data is used as inputs into one or more neural networks 1342*a-n* configured to produce as output a predicted price signal. As a last step 1714, the predicted price signal is sent to an ESS, wherein the prices signal may be used to configure the operation of the ESS. The configured ESS may represent a new state of the system, which can be sent as feedback to spatiotemporal transformation module 1330 and machine learning module 1340 in order to improve model performance.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 18:
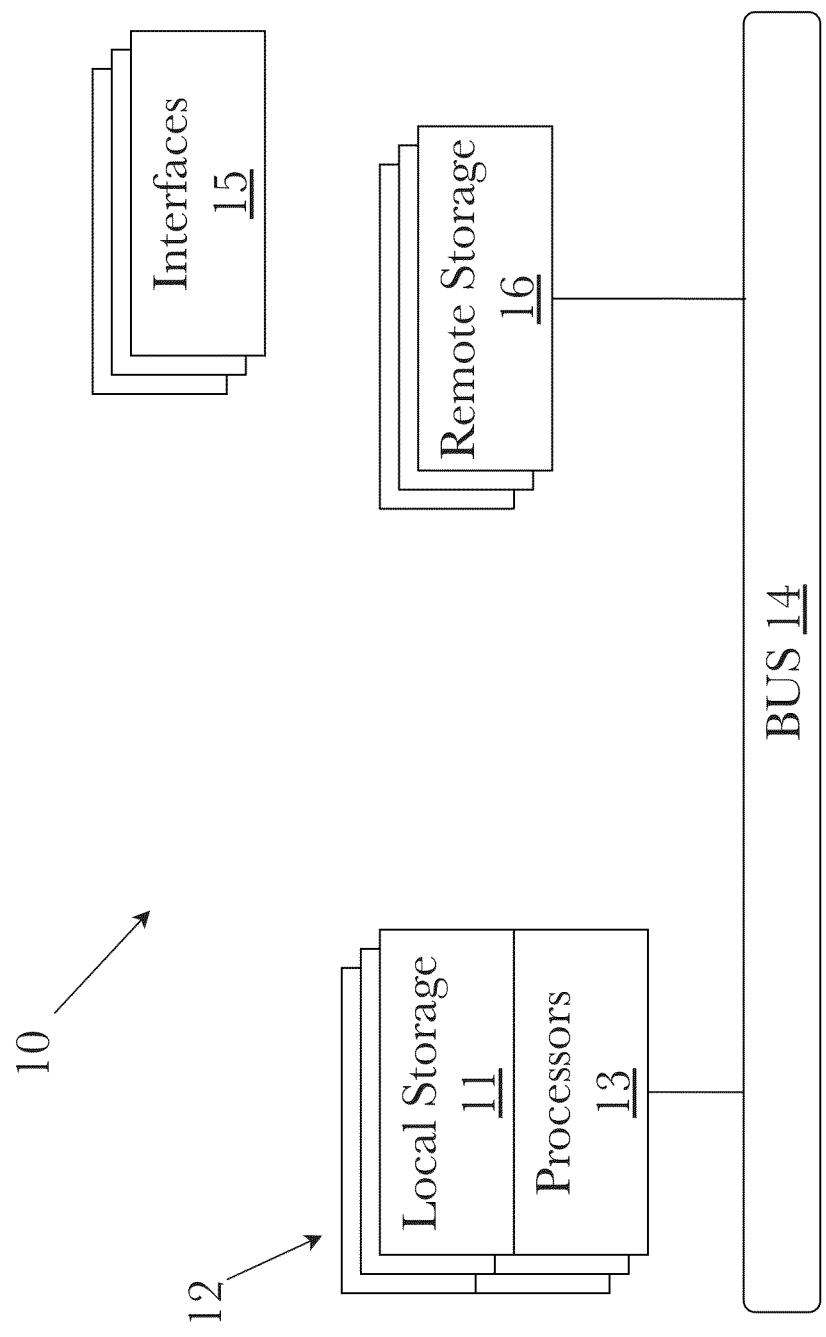
FIG. 18 is a block diagram illustrating an exemplary hardware architecture of a computing device used in various embodiments of the invention.

Referring now to FIG. 18, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 18 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 19:
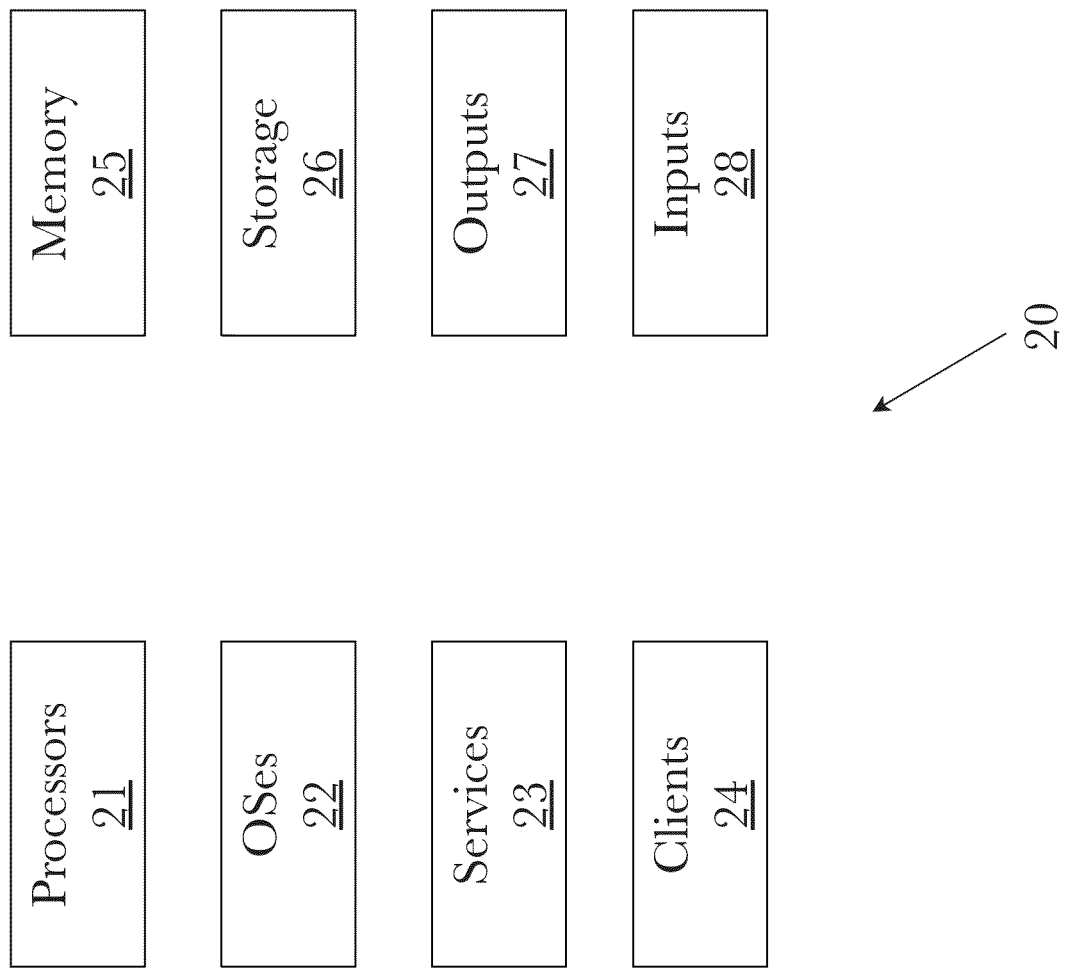
FIG. 19 is a block diagram illustrating an exemplary logical architecture for a client device, according to various embodiments of the invention.

In some aspects, systems may be implemented on a standalone computing system. Referring now to FIG. 19, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 18). Examples of storage devices 26 include flash memory, magnetic hard drive, CD-ROM, and/or the like.

Figure 20:
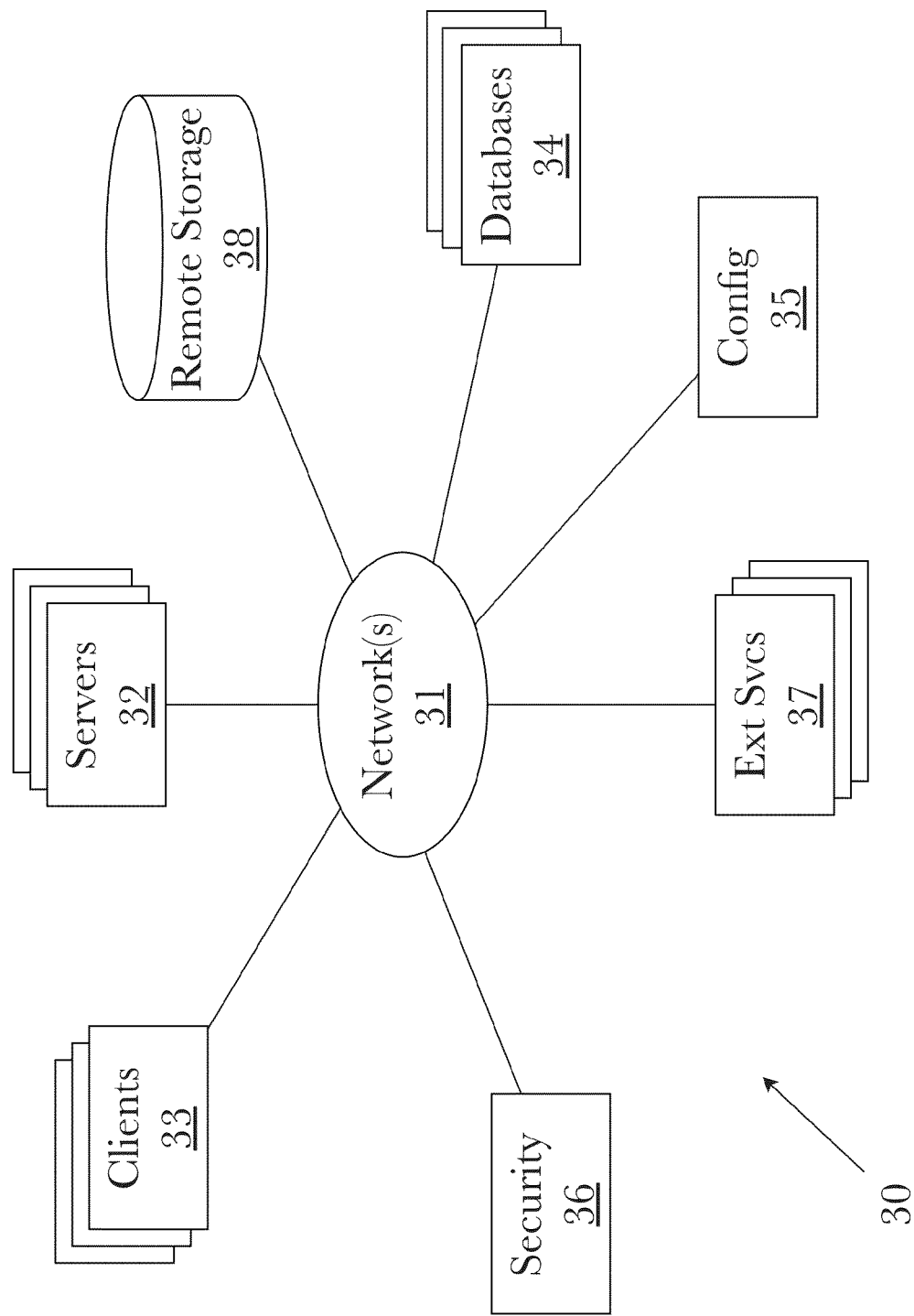
FIG. 20 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 20, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 18. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 21:
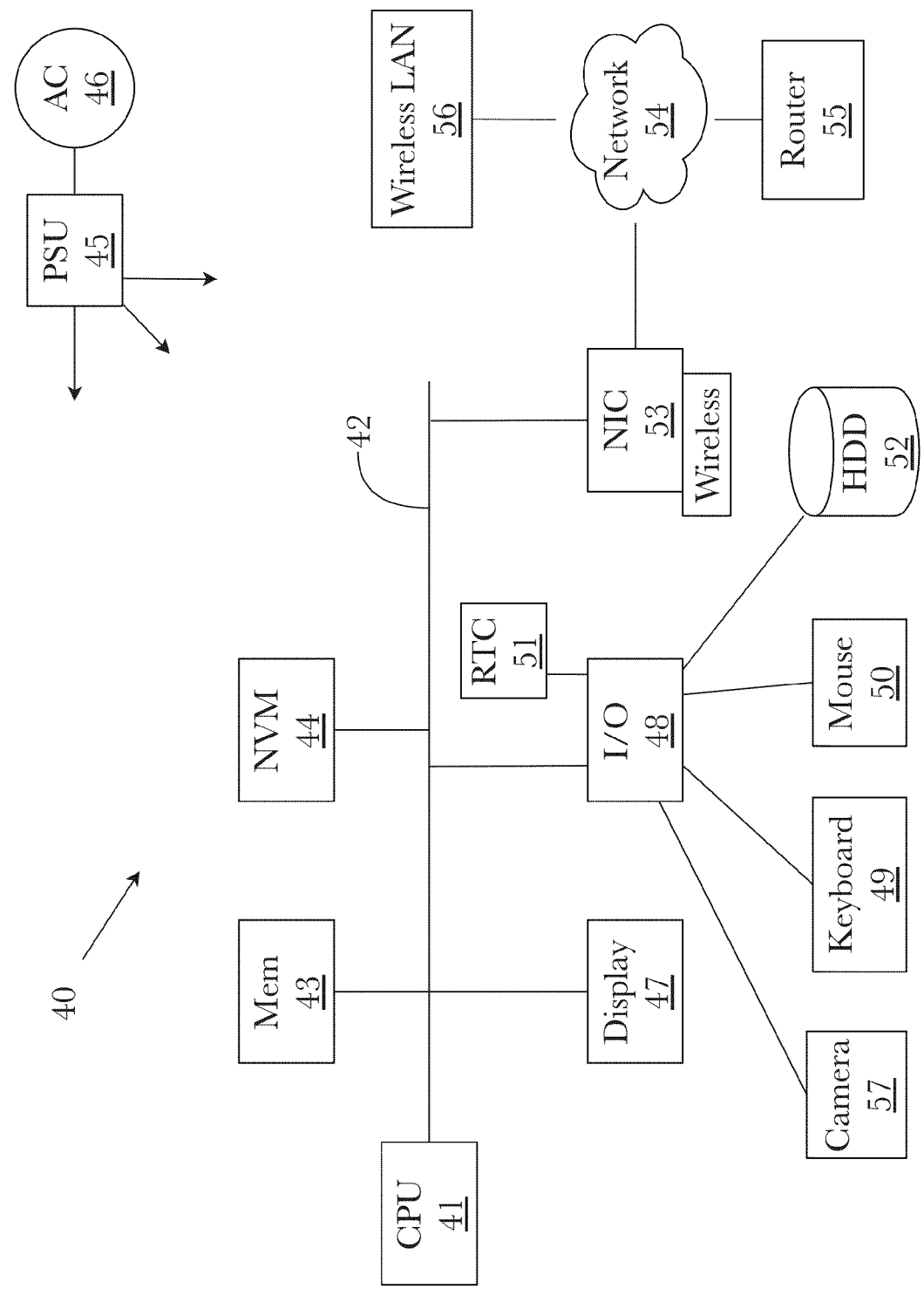
FIG. 21 is a block diagram illustrating an exemplary overview of a computer system as may be used in any of the various locations throughout the system.

FIG. 21 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for real-time distributed micro-grid optimization using price signals, comprising:
a computing device comprising a memory, a processor, and a non-volatile data storage device;
a pricing engine comprising a first plurality of programming instructions stored in the memory of, and operating on the processor of, the computing device, wherein the first plurality of programming instructions, when operating on the processor, cause the computing device to:
obtain a plurality of spatiotemporal information relating to an electrical grid, real-time traffic flow, and real-time energy demand;
spatially align the plurality of spatiotemporal information into one or more regions;
determine a load profile for each of the one or more specified regions, wherein the load profile is determined using real-time traffic flow and energy demand data;
receive an overall risk score for each of the one or more regions;
compute a state of charge and a maximum revenue for each of the one or more regions;
use the plurality of spatiotemporal information, the spatially aligned information, the load profile, the computed state of charge, the overall risk score, and the computed maximum revenue as inputs into a neural network configured to generate as output a predicted price signal for each of the one or more regions; and
distribute the price signal to each corresponding region of the one or more regions, wherein the price signal is used to configure the operation of an energy storage system within the corresponding region.

2. The system of claim 1, further comprising an optimization engine comprising a second plurality of programming instructions stored in the memory of, and operating on the processor of, the computing device, wherein the second plurality of programming instructions, when operating on the processor, cause the computing device to:
retrieve training data relating to the electrical grid and components of the electric grid for each specified region of the one or more regions;
retrieve training data relating to the climate and weather for a plurality of specified regions;

retrieve training data relating to socio-economic factors for a plurality of specified regions;

retrieve training data relating to local behavior patterns for a plurality of specified regions;

use the training data for each of the specified regions in the plurality of specified regions to calculate an overall risk score for each specified region; and send the overall risk score for each of the one or more regions to the pricing engine.

3. The system of claim 2, wherein the optimization engine is further configured to:

retrieve a status on the current energy demands for each of the specified regions in the plurality of specified regions;

receive monitored health and status data from a controller;

use the overall risk scores and the current energy demands for each of the specified regions and the electronic health and status data from a controller to optimize the energy storage of a high-voltage battery pack; and send a control signal to the controller, wherein the control signal causes the high-voltage battery pack to store more power, store less power, or maintain the current level of stored power.

4. The system of claim 1, wherein the pricing engine is further configured to:

construct and maintain a second neural network configured to determine the complex relationships between temporal and spatial data;

use the plurality spatiotemporal data, the spatially aligned data, the load profile, and overall risk scores as input into the second neural network, wherein the second neural network generates as output context-rich data relating temporal and spatial data together.

5. The system of claim 1, wherein the neural network is a deep reinforcement neural network.

6. The system of claim 1, wherein the one or more regions are represented as traffic analysis zones.

7. The system of claim 1, wherein the controller sets a time of charging of a high-voltage battery based on a grid condition.

8. The system of claim 7, wherein the grid condition is a time period wherein electricity rates are low.

9. The system of claim 7, wherein the grid condition is a time period when a proportion of energy supply to the grid from renewable energy sources is high.

10. The system of claim 1, wherein risk scores are calculated using one or more machine learning models.

11. A method for real-time distributed micro-grid optimization using price signals, comprising the steps of:

using a pricing engine comprising a first plurality of programming instructions stored in a memory of, and operating on a processor of, a computing device:

obtaining a plurality of spatiotemporal information relating to an electrical grid, real-time traffic flow, and real-time energy demand;

spatially aligning the plurality of spatiotemporal information into one or more regions;

determining a load profile for each on the one or more specified regions, wherein the load profile is determined using real-time traffic flow and energy demand data;

receiving an overall risk score for each of the one or more regions;

computing a state of charge and a maximum revenue for each of the one or more regions;

using the plurality of spatiotemporal information, the spatially aligned information, the load profile, the computed state of charge, the overall risk score, and the computed maximum revenue as inputs into a neural network configured to generate as output a predicted price signal for each of the one or more regions; and distributing the price signal to each corresponding region of the one or more regions, wherein the price signal is used to configure the operation of an energy storage system within the corresponding region.

12. The method of claim 11, further comprising the steps of: using an optimization engine comprising a second plurality of programming instructions stored in the memory of, and operating on the processor of, the computing device:

retrieving training data relating to the electrical grid and components of the electric grid for each specified region of the one or more regions;

retrieving training data relating to the climate and weather for a plurality of specified regions;

retrieving training data relating to socio-economic factors for a plurality of specified regions;

retrieving training data relating to local behavior patterns for a plurality of specified regions;

using the training data for each of the specified regions in the plurality of specified regions to calculate an overall risk score for each specified region; and sending the overall risk score for each of the one or more regions to the pricing engine.

13. The method of claim 12, further comprising the steps of: using the optimization engine:

retrieving a status on the current energy demands for each of the specified regions in the plurality of specified regions;

receiving monitored health and status data from a controller;

using the overall risk scores and the current energy demands for each of the specified regions and the electronic health and status data from a controller to optimize the energy storage of a high-voltage battery pack; and sending a control signal to the controller, the control signal causes the high-voltage battery pack to store more power, store less power, or maintain the current level of stored power.

14. The method of claim 11, further comprising the steps of: using the pricing engine:

constructing and maintaining a second neural network configured to determine the complex relationships between temporal and spatial data;

using the plurality spatiotemporal data, the spatially aligned data, the load profile, and overall risk scores as input into the second neural network, wherein the second neural network generates as output context-rich data relating temporal and spatial data together.

15. The method of claim 11, wherein the neural network is a deep reinforcement neural network.

16. The method of claim 11, wherein the one or more regions are represented as traffic analysis zones.

17. The method of claim 11, wherein the controller sets a time of charging of a high-voltage battery based on a grid condition.

18. The method of claim 17, wherein the grid condition is a time period wherein electricity rates are low.

19. The method of claim 17, wherein the grid condition is a time period when a proportion of energy supply to the grid from renewable energy sources is high.

20. The method of claim 11, wherein risk scores are calculated using one or more machine learning models.

* * * * *